(12) United States Patent
Tabata et al.

(10) Patent No.: US 11,325,584 B2
(45) Date of Patent: May 10, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yasuhiro Hiasa, Miyoshi (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 16/925,929

(22) Filed: Jul. 10, 2020

(65) Prior Publication Data
US 2021/0039628 A1 Feb. 11, 2021

(30) Foreign Application Priority Data

Aug. 8, 2019 (JP) .............................. JP2019-146856

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01); *B60W 2510/06* (2013.01); *B60W 2540/10* (2013.01)

(58) Field of Classification Search
CPC ...... B60W 20/10; B60W 20/13; B60W 20/15; B60W 20/19; B60W 10/00; B60W 10/04–08; B60W 2510/06–0609; B60W 2510/0671; B60W 2540/10; B60W 2540/106; F02D 2200/0406; F02D 2250/18; F02D 2250/21; F02D 2250/24
USPC ................. 701/101, 102; 180/65.21, 65.265, 180/65.275–65.285
See application file for complete search history.

(56) References Cited

U.S. PATENT DOCUMENTS

| 2004/0093867 | A1* | 5/2004 | Masuda | .............. | F02D 41/0007 |
| | | | | | 60/608 |
| 2004/0231897 | A1 | 11/2004 | Kimura et al. | | |

(Continued)

FOREIGN PATENT DOCUMENTS

| JP | 2005-002989 A | 1/2005 |
| JP | 2006-158154 A | 6/2006 |
| JP | 2010-111212 A | 5/2010 |

*Primary Examiner* — Robert A Werner
(74) *Attorney, Agent, or Firm* — Hunton Andrews Kurth LLP

(57) ABSTRACT

A control device for a hybrid vehicle includes: a drive control unit that calculates required drive power which is required for a hybrid vehicle based on an accelerator opening when an accelerator return operation is performed, calculates a target engine output which changes slowly with respect to a required engine output for realizing the required drive power through slow change processing, and controls an engine, a first rotary machine, and a second rotary machine such that an engine output reaches the target engine output; and a smoothing rate setting unit that changes a smoothing rate which is used for the slow change processing based on a supercharging pressure and sets the smoothing rate to a smaller value when the supercharging pressure is high than when the supercharging pressure is low.

4 Claims, 8 Drawing Sheets

(56) References Cited

U.S. PATENT DOCUMENTS

| | | | | |
|---|---|---|---|---|
| 2004/0255583 | A1* | 12/2004 | Otake | F02M 59/447 60/611 |
| 2006/0196183 | A1* | 9/2006 | Isogai | F02D 23/02 60/607 |
| 2006/0260305 | A1* | 11/2006 | Ishiwatari | F02B 37/10 60/599 |
| 2010/0275890 | A1* | 11/2010 | Mcdonald-Walker | F02B 33/40 123/564 |
| 2015/0275484 | A1* | 10/2015 | Ishihara | B60W 20/00 701/50 |
| 2016/0304081 | A1* | 10/2016 | Tsuchida | B60W 10/08 |
| 2017/0282901 | A1* | 10/2017 | Imamura | B60W 10/06 |
| 2021/0034074 | A1* | 2/2021 | Hiasa | B60W 10/101 |

* cited by examiner

FIG. 6

| TRAVEL MODE | | | | C1 | B1 | MG1 | MG2 |
|---|---|---|---|---|---|---|---|
| EV | FORWARD/ REVERSE | SINGLE- MOTOR DRIVE | DRIVE | | | G | M |
| | | | USE IN COMBINATION WITH ENGINE BRAKE | △ | △ | G | M |
| | | DOUBLE-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROL DEVICE FOR HYBRID VEHICLE

CROSS-REFERENCE TO RELATED APPLICATION

This application claims priority to Japanese Patent Application No. 2019-146856 filed on Aug. 8, 2019, incorporated herein by reference in its entirety.

BACKGROUND

1. Technical Field

The disclosure relates to a control device for a hybrid vehicle including a rotary machine that can adjust a rotation speed of an engine with a supercharger.

2. Description of Related Art

A control device for a hybrid vehicle including an engine with a supercharger, a rotary machine that can adjust a rotation speed of the engine, and a power storage device that transmits and receives electric power to and from the rotary machine is known. For example, a control device for a hybrid vehicle is described in Japanese Unexamined Patent Application Publication No. 2010-111212 (JP 2010-111212 A). JP 2010-111212 A discloses that a target engine output which changes slowly with respect to a required engine output (required engine power) for realizing required drive power is calculated through slow change processing and an engine and a rotary machine are controlled such that an engine output reaches the target engine output in order to control the engine such that the operation of the engine is stopped in a state in which the engine can be stably restarted after the operation thereof has been stopped when the operation of the engine is stopped by performing an accelerator return operation.

SUMMARY

In an engine with a supercharger, even when the accelerator return operation is performed, a response delay of an engine torque occurs due to a response delay of a supercharging pressure. In combination of this response delay with calculation of the target engine output which changes slowly with respect to a required engine output for realizing required drive power through the slow change processing, the generated electric power of the rotary machine is less likely to decrease rapidly. Accordingly, electric power which is input to a power storage device out of the generated electric power of the rotary machine is likely to exceed chargeable electric power.

The disclosure provides a control device for a hybrid vehicle that can prevent electric power which is input to a power storage device out of generated electric power of a rotary machine that can adjust a rotation speed of an engine with a supercharger from exceeding chargeable electric power.

According to a first aspect of the disclosure, there is provided (A) a control device for a hybrid vehicle including an engine with a supercharger, a first rotary machine that is able to adjust a rotation speed of the engine, and a power storage device that transmits and receives electric power to and from the first rotary machine, the control device including: (B) a drive control unit configured (b1) to calculate required drive power which is required for the hybrid vehicle based on an accelerator operation amount when an accelerator return operation is performed, (b2) to calculate a target engine output which changes slowly with respect to required engine output for realizing the required drive power through slow change processing, and (b3) to control the engine and the first rotary machine such that an engine output reaches the target engine output; and (C) a smoothing rate setting unit configured to change a smoothing rate which is used for the slow change processing based on a supercharging pressure in the engine and to set the smoothing rate to a smaller value when the supercharging pressure is high than when the supercharging pressure is low.

A second aspect of the disclosure provides the control device for a hybrid vehicle according to the first aspect, wherein the hybrid vehicle further includes a second rotary machine that transmits and receives electric power to and from the power storage device and is connected to a power transmission path between the engine and driving wheels in a power-transmittable manner, and wherein the second rotary machine consumes generated electric power of the first rotary machine when an accelerator depressing operation is performed and does not consume the generated electric power of the first rotary machine when the accelerator return operation is performed.

A third aspect of the disclosure provides the control device for a hybrid vehicle according to the first or second aspect, wherein the smoothing rate setting unit is configured to further set the smoothing rate to a smaller value when an accelerator return speed in the accelerator return operation is high than when the accelerator return speed in the accelerator return operation is low based on the accelerator return speed in the accelerator return operation.

A fourth aspect of the disclosure provides the control device for a hybrid vehicle according to any one of the first to third aspects, wherein the smoothing rate setting unit is configured to further set the smoothing rate to a smaller value when an accelerator operation amount after the accelerator return operation is small than when the accelerator operation amount after the accelerator return operation is large based on the accelerator operation amount after the accelerator return operation.

The control device for a hybrid vehicle according to the first aspect of the disclosure includes: (A) the drive control unit configured (a1) to calculate required drive power which is required for the hybrid vehicle based on an accelerator operation amount when an accelerator return operation is performed, (a2) to calculate a target engine output which changes slowly with respect to required engine output for realizing the required drive power through slow change processing, and (a3) to control the engine and the first rotary machine such that an engine output reaches the target engine output; and (B) the smoothing rate setting unit configured to change a smoothing rate which is used for the slow change processing based on a supercharging pressure in the engine and to set the smoothing rate to a smaller value when the supercharging pressure is high than when the supercharging pressure is low. In this way, when the accelerator return operation is performed, the smoothing rate is set to a smaller value when the supercharging pressure is high than when the supercharging pressure is low. Accordingly, even in a case in which the supercharging pressure is high such that a response delay of the supercharging pressure is likely to occur, the operation of the engine is stopped, for example, in a state in which the engine is stably restarted after the operation of the engine has been stopped, the engine output decreases rapidly in comparison with a case in which the smoothing rate is set to a great value similarly to the case in which the supercharging pressure is low, and the generated electric power of the first rotary machine decreases rapidly. As a result, electric power which is input to the power storage device out of the generated electric power of the first rotary machine is prevented from exceeding chargeable electric power.

In the control device for a hybrid vehicle according to the second aspect of the disclosure, the hybrid vehicle further includes a second rotary machine that transmits and receives electric power to and from the power storage device and is connected to a power transmission path between the engine and driving wheels in a power-transmittable manner, and the second rotary machine consumes generated electric power of the first rotary machine when an accelerator depressing operation is performed and does not consume the generated electric power of the first rotary machine when the accelerator return operation is performed. When the accelerator return operation is performed in a state in which the accelerator depressing operation is being performed, a state in which the generated electric power of the first rotary machine is consumed in the second rotary machine is changed to a state in which the generated electric power is not consumed and thus electric power which is input to the power storage device out of the generated electric power of the first rotary machine is likely to exceed chargeable electric power. Since the smoothing rate is set to a smaller value when the supercharging pressure is high than when the supercharging pressure is low, the engine output decreases rapidly in comparison with a case in which the smoothing rate is set to a great value similarly to the case in which the supercharging pressure is low and the generated electric power of the first rotary machine decreases rapidly even when the supercharging pressure is high such that a response delay of the supercharging pressure is likely to occur. As a result, electric power which is input to the power storage device out of the generated electric power of the first rotary machine is prevented from exceeding chargeable electric power.

In the control device for a hybrid vehicle according to the third aspect of the disclosure, the smoothing rate setting unit further sets the smoothing rate to a smaller value when an accelerator return speed in the accelerator return operation is high than when the accelerator return speed is low based on the accelerator return speed in the accelerator return operation. In this way, since the smoothing rate is set to a smaller value when the accelerator return speed in the accelerator return operation is high than when the accelerator return speed in the accelerator return operation is low, the engine output decreases at a rate corresponding to a driver's intention of deceleration.

In the control device for a hybrid vehicle according to the fourth aspect of the disclosure, the smoothing rate setting unit further sets the smoothing rate to a smaller value when an accelerator operation amount after the accelerator return operation is small than when the accelerator operation amount is large based on the accelerator operation amount after the accelerator return operation. In this way, since the smoothing rate is set to a smaller value when the accelerator operation amount after the accelerator return operation is small than when the accelerator operation amount after the accelerator return operation is large, the engine output decreases at a rate corresponding to a driver's intention of deceleration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is an engagement operation table illustrating a relationship between travel modes and combinations of operating states of a clutch and a brake which are used therein;

DETAILED DESCRIPTION OF EMBODIMENTS

Hereinafter, embodiments of the disclosure will be described in detail with reference to the accompanying drawings. In the following embodiments, the drawings are appropriately simplified or modified, and dimensional ratios, shapes, and the like of constituent elements are not necessarily accurate.

Figure 1:
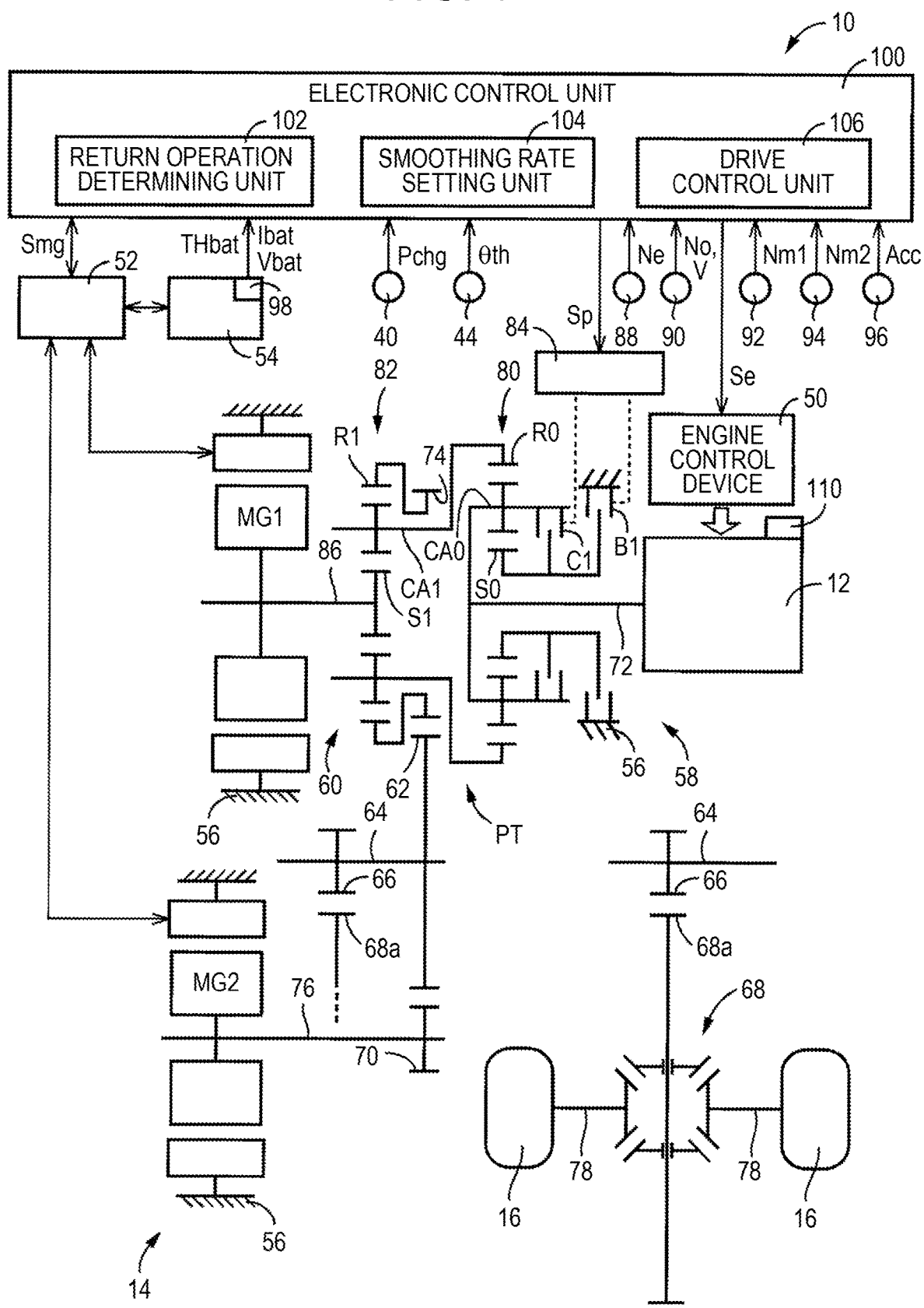
FIG. 1 is a functional block diagram schematically illustrating a configuration of a vehicle in which an electronic control unit according to a first embodiment of the disclosure is mounted and illustrating a principal part of a control function for various types of control in the vehicle.

FIG. 1 is a diagram schematically illustrating a configuration of a hybrid vehicle 10 in which an electronic control unit 100 according to a first embodiment of the disclosure is mounted and illustrating a principal part of a control function for various types of control in the hybrid vehicle 10. The hybrid vehicle 10 (hereinafter referred to as a "vehicle 10") includes an engine 12, a first rotary machine MG1, a second rotary machine MG2, a power transmission device 14, and driving wheels 16.

Figure 2:
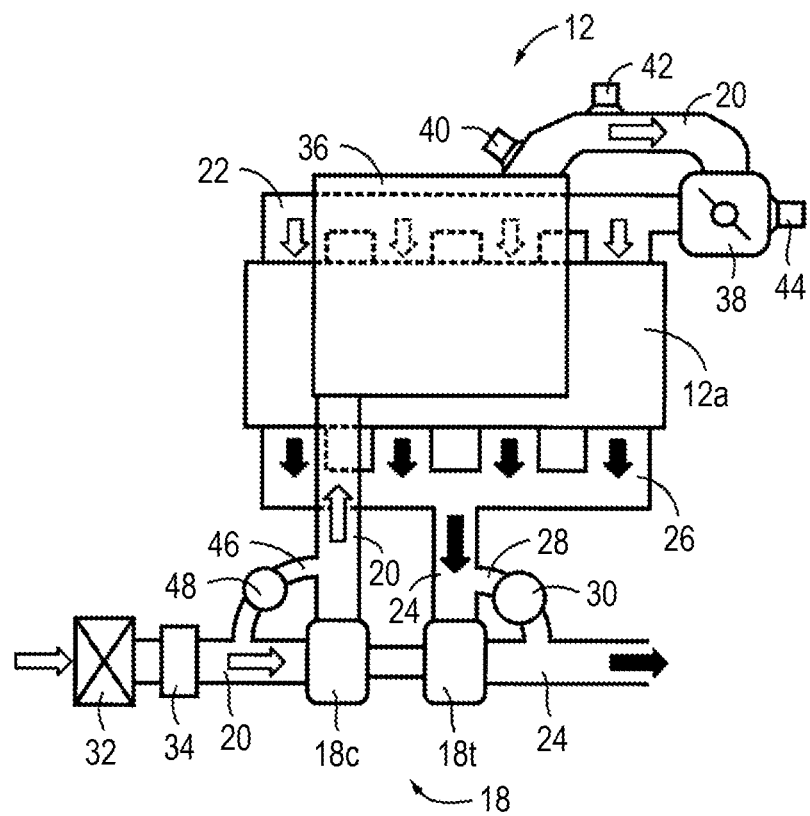
FIG. 2 is a diagram schematically illustrating a configuration of an engine illustrated in FIG. 1.

FIG. 2 is a diagram schematically illustrating a configuration of the engine 12 illustrated in FIG. 1. The engine 12 is a power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t. The compressor 18c is rotationally driven by the turbine 18t to compress air suctioned into the engine 12, that is, intake air.

An exhaust bypass 28 that causes exhaust gas to flow from upstream to downstream with respect to the turbine 18t by bypassing the turbine 18t is provided in the exhaust pipe 24. A waste gate valve 30 (hereinafter referred to as "WGV 30") that continuously controls a ratio of exhaust gas passing through the exhaust bypass 28 to exhaust gas passing through the turbine 18t is provided in the exhaust bypass 28. A valve opening of the WGV 30 is continuously adjusted by causing the electronic control unit 100 which will be described later to operate an actuator which is not illustrated. As the valve opening of the WGV 30 increases, exhaust gas of the engine 12 is more likely to be discharged via the exhaust bypass 28. Accordingly, in a supercharged state of the engine 12 in which a supercharging operation of the supercharger 18 works, a supercharging pressure Pchg [Pa] from the supercharger 18 decreases as the valve opening of the WGV 30 increases. The supercharging pressure Pchg from the supercharger 18 is a pressure of intake air and is an air pressure downstream from the compressor 18c in the intake pipe 20. A side on which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing an electronic control unit 100 which will be described later to operate a throttle actuator which is not illustrated is provided in the intake pipe 20 downstream from the intercooler 36 and upstream from the intake manifold 22. A supercharging pressure sensor 40 that detects a supercharging pressure Pchg from the supercharger 18 and an intake air temperature sensor 42 that detects an intake air temperature which is the temperature of intake air are provided in the intake pipe 20 between the intercooler 36 and the electronic throttle valve 38. A throttle valve opening sensor 44 that detects a throttle valve opening θth [%] which is an opening of the electronic throttle valve 38 is provided in the vicinity of the electronic throttle valve 38, for example, in the throttle actuator.

An air recirculation bypass 46 that causes air to flow again from downstream to upstream with respect to the compressor 18c by bypassing the compressor 18c is provided in the intake pipe 20. For example, an air bypass valve 48 that is opened to curb occurrence of a surge and to protect the compressor 18c at the time of sudden closing of the electronic throttle valve 38 is provided in the air recirculation bypass 46.

In the engine 12, an engine torque Te [Nm] which is an output torque of the engine 12 is controlled by causing the electronic control unit 100 which will be described later to control an engine control device 50 (see FIG. 1) including, for example, the electronic throttle valve 38, a fuel injection device, an ignition device, and the WGV 30.

Referring back to FIG. 1, a known exhaust gas recirculation device 110 is provided in the vehicle 10. The exhaust gas recirculation device 110 is a means that decreases an amount of nitrogen oxide in exhaust gas, and serves to return some exhaust gas to the intake pipe 20 and to decrease a maximum temperature at the time of combustion of mixed gas to decrease an amount of nitrogen oxide (NOx) generated. An amount of exhaust gas which is returned to the intake pipe 20 is controlled by an EGR valve which is controlled based on a negative pressure in the vicinity of the electronic throttle valve 38 or an exhaust gas pressure in the exhaust pipe 24.

The first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as power sources for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tm1 [Nm] which is an output torque of the first rotary machine MG1 and an MG2 torque Tm2 [Nm] which is an output torque of the second rotary machine MG2 are controlled by causing the electronic control unit 100 which will be described later to control the inverter 52. For example, in the case of forward rotation, an output torque of a rotary machine is a powering torque on a positive torque side which is an acceleration side and is a regenerative torque on a negative torque side which is a deceleration side. The battery 54 transmits and receives electric power to and from the first rotary machine MG1 and the second rotary machine MG2. The battery 54 is a chargeable/dischargeable secondary battery such as a lithium-ion battery pack or a nickel-hydride battery pack. The first rotary machine MG1 and the second rotary machine MG2 are provided in a case 56 which is a non-rotary member attached to the vehicle body. The battery 54 corresponds to a "power storage device" in the disclosure.

The power transmission device 14 includes a gear shifting unit 58, a differential unit 60, a driven gear 62, a driven shaft 64, a final gear 66, a differential gear 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential gear 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel to the input shaft 72 is connected to the reduction gear 70 separately from the input shaft 72 and the second rotary machine MG2 is connected to the driven gear 62 in a power-transmittable manner. The power transmission device 14 includes an axle 78 that is connected to the differential gear 68 or the like.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62. The power transmitted to the driven gear 62 is transmitted to the driving wheels 16 sequentially via the final gear 66, the differential gear 68, the axle 78, and the like. In the power transmission device 14, the gear shifting unit 58, the differential unit 60, the driven gear 62, the driven shaft 64, the final gear 66, the differential gear 68, and the axle 78 constitute a power transmission path PT which is provided between the engine 12 and the driving wheels 16. In this way, the second rotary machine MG2 is connected to the power transmission path PT via the reduction gear 70 in a power-transmittable manner, and the second rotary machine MG2 is connected to the driving wheels 16 in a power-transmittable manner.

The gear shifting unit 58 includes a first planetary gear mechanism 80, a clutch C1, and a brake B1. The first planetary gear mechanism 80 is a known single-pinion type planetary gear device including a sun gear S0, a carrier CA0, and a ring gear R0. The differential unit 60 includes a second planetary gear mechanism 82. The second planetary gear mechanism 82 is a known single-pinion type planetary gear device including a sun gear S1, a carrier CA1, and a ring gear R1.

The clutch C1 and the brake B1 are hydraulic frictional engagement devices including a multi-disc or single-disc clutch or brake which is pressed by a hydraulic actuator or a band brake which is tightened by a hydraulic actuator. In the clutch C1 and the brake B1, operating states such as an engaged state and a disengaged state are switched based on regulated hydraulic pressures which are output from a hydraulic pressure control circuit 84 provided in the vehicle 10 by causing the electronic control unit 100 which will be described later to control the hydraulic pressure control circuit 84.

The first planetary gear mechanism 80, the second planetary gear mechanism 82, the clutch C1, and the brake B1 are connected to each other as illustrated in FIG. 1.

In a state in which both the clutch C1 and the brake B1 are disengaged, a differential operation of the first planetary gear mechanism 80 is permitted. In this state, since a reaction torque of the engine torque Te does not appear in the sun gear S0, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. In this state, rotation of the engine 12 is transmitted from the ring gear R0 to the carrier CA1 at a constant speed. On the other hand, in a state in which the clutch C1 is disengaged and the brake B1 is engaged, rotation of the sun gear S0 of the first planetary gear mechanism 80 is prohibited and rotation of the ring gear R0 is increased to be higher than rotation of the carrier CA0. In this state, rotation of the engine 12 is increased and output from the ring gear R0.

In this way, the gear shifting unit 58 serves as a two-stage stepped transmission which can be switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. In this state, rotation of the ring gear R0 which is an output rotary member of the gear shifting unit 58 is stopped and thus rotation of the carrier CA1 which is an input rotary member of the differential unit 60 is stopped.

In the second planetary gear mechanism 82, the carrier CA1 is a rotary element that is connected to the ring gear R0 which is an output rotary member of the gear shifting unit 58 and serves as an input rotary member of the differential unit 60. The sun gear S1 is a rotary element that is integrally connected to the rotor shaft 86 of the first rotary machine MG1 and is connected to the first rotary machine MG1 in a power-transmittable manner. The ring gear R1 is a rotary element that is integrally connected to the drive gear 74 and is connected to the driving wheels 16 in a power-transmittable manner and serves as an output rotary member of the differential unit 60.

The second planetary gear mechanism 82 is a power split mechanism that mechanically splits power of the engine 12 which is input to the carrier CA1 via the gear shifting unit 58 to the first rotary machine MG1 and the drive gear 74. That is, the second planetary gear mechanism 82 is a differential mechanism that splits and transmits the power of the engine 12 to the driving wheels 16 and the first rotary machine MG1. In the second planetary gear mechanism 82, the carrier CA1 serves as an input element, the sun gear S1 serves as a reaction element, and the ring gear R1 serves as an output element. The differential unit 60 constitutes an electrical gear shifting mechanism, for example, an electrical stepless transmission, in which a differential state of the second planetary gear mechanism 82 (that is, a differential state of the differential unit 60) is controlled by controlling the operating state of the first rotary machine MG1 that is connected to the second planetary gear mechanism 82 in a power-transmittable manner. The differential unit 60 which is a stepless transmission is provided in the power transmission path PT. The first rotary machine MG1 is a rotary machine to which the power of the engine 12 is transmitted. Since the gear shifting unit 58 is in an overdrive state, an increase in torque of the first rotary machine MG1 is curbed.

Figure 3:
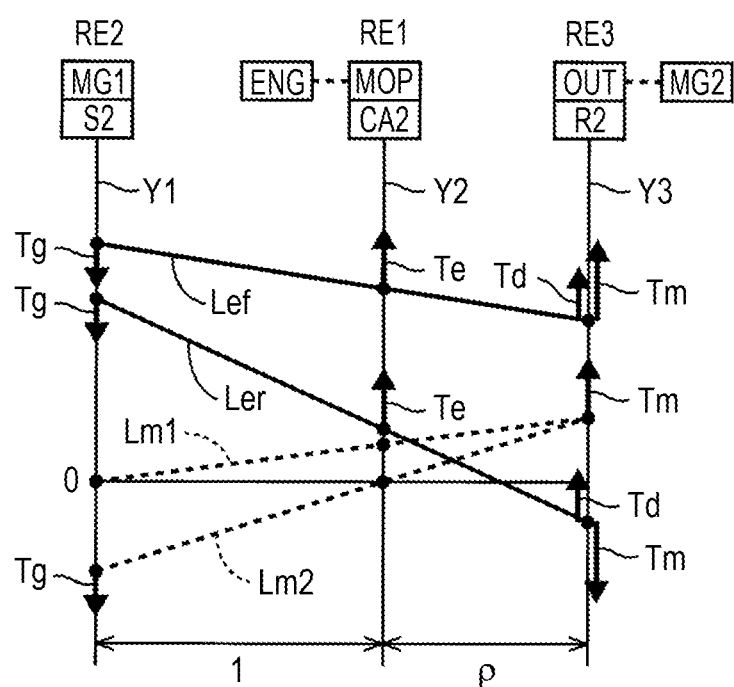
FIG. 3 is a collinear diagram illustrating a relative relationship between rotation speeds of rotary elements in a differential unit illustrated in FIG. 1.

FIG. 3 is a collinear diagram illustrating relative relationships between rotation speeds of the rotary elements in the differential unit 60 illustrated in FIG. 1. In FIG. 3, three vertical lines Y1, Y2, and Y3 correspond to three rotary elements of the second planetary gear mechanism 82 constituting the differential unit 60. The vertical line Y1 represents the rotation speed of the sun gear S1 which is a second rotary element RE2 connected to the first rotary machine MG1 (see "MG1" in FIG. 3). The vertical line Y2 represents the rotation speed of the carrier CA1 which is a first rotary element RE1 connected to the engine 12 (see "ENG" in FIG. 3) via the gear shifting unit 58. The vertical line Y3 represents the rotation speed of the ring gear R1 which is a third rotary element RE3 integrally connected to the drive gear 74 (see "OUT" in FIG. 3). The second rotary machine MG2 (see "MG2" in FIG. 3) is connected to the driven gear 62 engaging with the drive gear 74 via the reduction gear 70 or the like. The gaps between the vertical lines Y1, Y2, and Y3 are determined according to a gear ratio ρ (=number of teeth of the sun gear S1/number of teeth of the ring gear R1) of the second planetary gear mechanism 82. In the relationship between the vertical axes in the collinear diagram, when the gap between the sun gear S1 and the carrier CA1 corresponds to "1," the gap between the carrier CA1 and the ring gear R1 corresponds to the gear ratio ρ.

A mechanical oil pump (see "MOP" in FIG. 3) which is provided in the vehicle 10 is connected to the carrier CA1. This mechanical oil pump is operated with rotation of the carrier CA1 to supply oil which is used for engaging operations of the clutch C1 and the brake B1, lubrication of the parts, and cooling of the parts. When rotation of the carrier CA1 is stopped, the oil is supplied by an electrical oil pump (not illustrated) which is provided in the vehicle 10.

A solid line Lef in FIG. 3 denotes an example of relative speeds of the rotary elements at the time of forward travel in an HV travel mode which is a travel mode in which HV travel (hybrid travel) using at least the engine 12 as a power source is possible. A solid line Ler in FIG. 3 denotes an example of relative speeds of the rotary elements at the time of reverse travel in the HV travel mode.

In the HV travel mode, in the second planetary gear mechanism 82, for example, when an MG1 torque Tm1 which is a reaction torque and a negative torque of the first rotary machine MG1 with respect to an engine torque Te that is a positive torque which is input to the carrier CA1 via the gear shifting unit 58 is input to the sun gear S1, a direct engine-transmitted torque Td [Nm] which is a positive torque appears in the ring gear R1. For example, when the MG1 torque Tm1 (=−ρ/(1+ρ)×Te) which is a reaction torque with respect to the engine torque Te which is input to the carrier CA1 is input to the sun gear S1 in a state in which the clutch C1 is engaged, the brake B1 is disengaged, and the gear shifting unit 58 is in a directly coupled state with a gear ratio of "1.0," the direct engine-transmitted torque Td (=Te/(1+ρ)=−(1/ρ)×Tm1) appears in the ring gear R1. A combined torque of the direct engine-transmitted torque Td and the MG2 torque Tm2 which are transmitted to the driven gear 62 can be transmitted as an actual drive torque Trr [Nm] of the vehicle 10 to the driving wheels 16 according to required drive power Pr*[N].

The first rotary machine MG1 serves as a power generator when a negative torque is generated at the time of forward rotation. Generated electric power Wg [W] of the first rotary machine MG1 is charged in the battery 54 or is consumed in the second rotary machine MG2. The second rotary machine MG2 consumes all or some of the generated electric power Wg or consumes electric power from the battery 54 in addition to the generated electric power Wg and outputs the MG2 torque Tm2. The MG2 torque Tm2 at the time of forward travel is a powering torque which is a positive torque at the time of forward rotation, and the MG2 torque Tm2 at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the sun gear S1, increases or decreases with respect to an output rotation speed No [rpm] which is the rotation speed of the drive gear 74 which is constrained on rotation of the driving wheels 16 by controlling the operating state of the first rotary machine MG1, the rotation speed of the carrier CA1 increases or decreases. Since the carrier CA1 is connected to the engine 12 via the gear shifting unit 58, an engine rotation speed Ne [rpm] which is the rotation speed of the engine 12 increases or decreases with the increase or decrease in the rotation speed of the carrier CA1. Accordingly, in the HV travel, it is possible to perform control such that an engine operating point OPeng is set to an efficient operating point. This hybrid type is referred to as a mechanical split type or a split type. The first rotary machine MG1 is a rotary machine that can control the engine rotation speed Ne. The engine operating point OPeng is an operation point of the engine 12 which is expressed by the engine rotation speed Ne and the engine torque Te. The engine rotation speed Ne corresponds to a "rotation speed of an engine" in the disclosure.

A dotted line Lm1 in FIG. 3 represents an example of relative speeds of the rotary elements at the time of forward travel in a single-motor-driven EV travel mode in which EV travel (motor-driven travel) using only the second rotary machine MG2 as a power source in a state in which the operation of the engine 12 is stopped is possible. In the single-motor-driven EV travel mode, when both the clutch C1 and the brake B1 are disengaged and the gear shifting unit 58 is put into a neutral state, the differential unit 60 is also put into a neutral state. In this state, the MG2 torque Tm2 can be transmitted as a drive torque Trr of the vehicle 10 to the driving wheels 16. In the single-motor-driven EV travel mode, for example, the first rotary machine MG1 is maintained at zero rotation in order to decrease a drag loss in the first rotary machine MG1. For example, even when control for maintaining the first rotary machine MG1 at zero rotation is performed, the differential unit 60 is in the neutral state and thus the drive torque Trr is not affected.

A dotted line Lm2 in FIG. 3 represents an example of relative speeds of the rotary elements at the time of forward travel in a double-motor-driven EV travel mode in which EV travel using both the first rotary machine MG1 and the second rotary machine MG2 as power sources in a state in which the operation of the engine 12 is stopped is possible. In the double-motor-driven EV travel mode, when both the clutch C1 and the brake B1 are engaged and rotation of the rotary elements of the first planetary gear mechanism 80 is prohibited, the carrier CA1 is stopped at zero rotation. In this state, the MG1 torque Tm1 and the MG2 torque Tm2 can be transmitted as the drive torque Trr of the vehicle 10 to the driving wheels 16.

Figure 4:
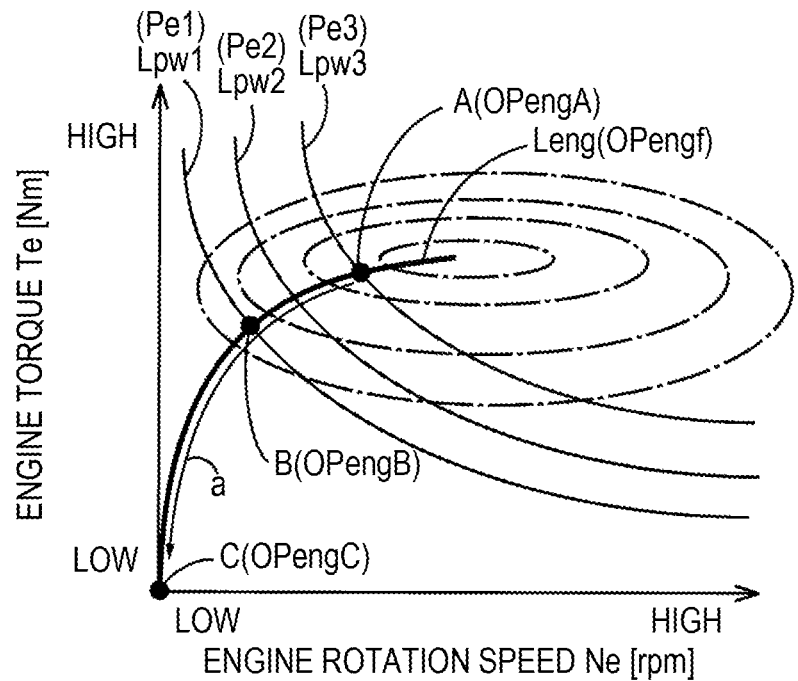
FIG. 4 is a diagram illustrating an example of an optimal engine operating point in a two-dimensional coordinate system with an engine rotation speed and an engine torque as variables.

FIG. 4 is a diagram illustrating an example of optimal engine operating points OPengf in a two-dimensional coordinate system with the engine rotation speed Ne and the engine torque Te as variables. In FIG. 4, a maximum efficiency line Leng denotes a group of optimal engine operating points OPengf. An optimal engine operating point OPengf is predetermined as an engine operating point OPeng at which total fuel efficiency in the vehicle 10 is the best in consideration of charging/discharging efficiency in the battery 54 in addition to fuel efficiency of the engine 12 alone, for example, when a required engine output (required engine power) Pe* [W] is realized. That is, the engine rotation speed Ne at an optimal engine operating point OPengf is an optimal fuel-efficiency rotation speed Neeff at which the engine 12 can most efficiently output the required engine output Pe* [W].

Equi-engine-output lines Lpw1, Lpw2, and Lpw3 denote examples in which the required engine output Pe* is engine outputs Pe1, Pe2, and Pe3, respectively. A point A is an engine operating point OPengA when the engine output Pe3 is realized at the optimal engine operating point OPengf, a point B is an engine operating point OPengB when the engine output Pe1 is realized at the optimal engine operating point OPengf, and a point C is an engine operating point OPengC when an actual engine output Per [W] is realized at the optimal engine operating point OPengf such that it becomes zero. The points A, B, and C are also target values of the engine operating point OPeng which is expressed by a target engine rotation speed Netgt [rpm] and a target engine torque Tetgt [Nm], that is, a target engine operating point OPengtgt. That is, the target engine rotation speed Netgt is a target value of the engine rotation speed Ne and the target engine torque Tetgt is a target value of the engine torque Te. The engine output Per is power which is output from the engine 12.

Although not illustrated in FIG. 4, the optimal engine operating points OPengf at which the fuel efficiency is the highest in the engine 12 with the supercharger 18 are stored in advance with a supercharging pressure Pchg in addition to the engine rotation speed Ne and the engine torque Te as variables. The supercharging pressure Pchg when the required engine output Pe* is realized at the optimal engine operating points OPengf is a target supercharging pressure Pchgtgt [Pa].

Figure 5:
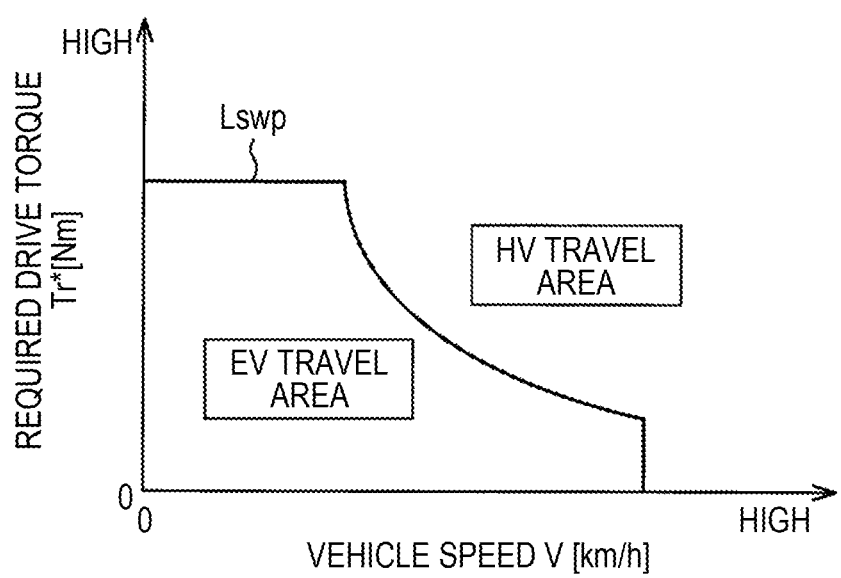
FIG. 5 is a diagram illustrating an example of a power source switching map which is used for switching control between EV travel and HV travel.

FIG. 5 is a diagram illustrating an example of a power source switching map which is used for switching control between EV travel and HV travel. In FIG. 5, a solid line Lswp is a boundary line between an EV travel area and an HV travel area at which switching between the EV travel and the HV travel is performed. An area in which a vehicle speed V [km/h] is relatively low and a required drive torque Tr* [Nm] is relatively low (that is, required drive power Pr* is relatively small) is defined in advance in the EV travel area. An area in which the vehicle speed V is relatively high and the required drive torque Tr* is relatively high (that is, the required drive power Pr* is relatively great) is defined in advance in the HV travel area. When a state of charge value SOC [%] of the battery 54 which will be described later is less than a predetermined value or when warming-up of the engine 12 is necessary, the EV travel area in FIG. 5 may be changed to the HV travel area. The predetermined value is a predetermined threshold value for determining that the state of charge value SOC is a value at which the engine 12 needs to be forcibly started to charge the battery 54.

Here, an operation in which an accelerator opening Acc [%] is kept constant and an operation of increasing the accelerator opening Acc when the engine 12 is operating are referred to as an accelerator depressing operation. For example, when the vehicle 10 is in an HV travel state, the accelerator depressing operation includes an operation in which an amount of operation of an accelerator pedal (not illustrated) which is depressed by a driver is kept constant and an operation in which the amount of operation of the accelerator pedal is increased (that is, a force of depressing the accelerator pedal is increased). An operation of decreasing the accelerator opening Acc is referred to as an accelerator return operation. For example, the accelerator return operation is an operation in which the amount of operation of the accelerator pedal which is depressed by the driver is decreased (that is, the accelerator pedal is returned) and includes a case in which the required drive torque Tr* is decreased by decreasing the accelerator opening Acc to zero or the vicinity of zero and the travel state of the vehicle 10 is switched from the HV travel to EV travel to stop the operation of the engine 12 as illustrated in FIG. 5. The accelerator opening Acc corresponds to an "accelerator operation amount" in the disclosure.

FIG. 6 is an engagement operation table illustrating a relationship between travel modes and combinations of operating states of the clutch C1 and the brake B1 which are used in the travel modes. In FIG. 6, "O" denotes an engaged state, a blank denotes a disengaged state, and "Δ" denotes that one of the clutch C1 and the brake B1 is engaged at the time of additional use of an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as travel modes. The EV travel mode has two modes including the single-motor-driven EV travel mode and the double-motor-driven EV travel mode.

The single-motor-driven EV travel mode is realized in a state in which both the clutch C1 and the brake B1 are disengaged. In the single-motor-driven EV travel mode, the clutch C1 and the brake B1 are disengaged and thus the gear shifting unit 58 is put into a neutral state. When the gear shifting unit 58 is put into the neutral state, the differential unit 60 is put into a neutral state in which a reaction torque of the MG1 torque Tm1 does not appear in the carrier CA1 connected to the ring gear R0. In this state, the electronic control unit 100 causes the second rotary machine MG2 to output the MG2 torque Tm2 for travel (see a dotted line Lm1 in FIG. 3). In the single-motor-driven EV travel mode, reverse travel may be performed by rotating the second rotary machine MG2 opposite to the rotating direction at the time of forward travel.

In the single-motor-driven EV travel mode, since the ring gear R0 is corotated with the carrier CA1 but the gear shifting unit 58 is in the neutral state, the engine 12 is not corotated but is stopped at zero rotation. Accordingly, when regeneration control is performed in the second rotary machine MG2 during travel in the single-motor-driven EV travel mode, a large amount of regeneration is possible. When the battery 54 is fully charged and regenerative energy does not appear during travel in the single-motor-driven EV travel mode, additional use of the engine brake can be considered. When the engine brake is also used, the brake B1 or the clutch C1 is engaged (see "use in combination with engine brake" in FIG. 6). When the brake B1 or the clutch C1 is engaged, the engine 12 is corotated and the engine brake operates.

The double-motor-driven EV travel mode is realized in a state in which both the clutch C1 and the brake B1 are engaged. In the double-motor-driven EV travel mode, since the clutch C1 and the brake B1 are engaged, rotation of the rotary elements of the first planetary gear mechanism 80 is stopped, the engine 12 is stopped at zero rotation, and rotation of the carrier CA1 connected to the ring gear R0 is stopped. When rotation of the carrier CA1 is stopped, a reaction torque of the MG1 torque Tm1 appears in the carrier CAL and thus the MG1 torque Tm1 can be mechanically output from the ring gear R1 and transmitted to the driving wheels 16. In this state, the electronic control unit 100 causes the first rotary machine MG1 and the second rotary machine MG2 to output the MG1 torque Tm1 and the MG2 torque Tm2 for travel (see the dotted line Lm2 in FIG. 3). In the double-motor-driven EV travel mode, both the first rotary machine MG1 and the second rotary machine MG2 can be rotated opposite to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 is put into a directly coupled state. Accordingly, rotation of the engine 12 is transmitted from the ring gear R0 to the carrier CA1 at a constant speed. A high state of the HV travel mode is realized in a state in which the brake B1 is engaged and the clutch C1 is disengaged. In the high state of the HV travel mode, since the brake B1 is engaged, rotation of the sun gear S0 is stopped and the gear shifting unit 58 is put into an overdrive state. Accordingly, rotation of the engine 12 increases and is transmitted from the ring gear R0 to the carrier CA1. In the HV travel mode, the electronic control unit 100 causes the first rotary machine MG1 to output the MG1 torque Tm1 which is a reaction torque of the engine torque Te by power generation and causes the second rotary machine MG2 to output the MG2 torque Tm2 by the generated electric power Wg of the first rotary machine MG1 (see a solid line Lef in FIG. 3). In the HV travel mode, for example, in the low state of the HV travel mode, the second rotary machine MG2 can also be rotated opposite to the rotating direction at the time of forward travel to allow reverse travel (see a solid line Ler in FIG. 3). In the HV travel mode, the vehicle can travel additionally using the MG2 torque Tm2 based on electric power from the battery 54. In the HV travel mode, for example, when the vehicle speed V is relatively high and the required drive torque Tr* is relatively small, the high state of the HV travel mode is set up.

Referring back to FIG. 1, the vehicle 10 further includes the electronic control unit 100 serving as a controller including a control device for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity. The electronic control unit 100 corresponds to a "control device" in the disclosure.

The electronic control unit 100 is supplied with various signals (for example, a supercharging pressure Pchg, a throttle valve opening θth, an engine rotation speed Ne, an output rotation speed No corresponding to a vehicle speed V, an MG1 rotation speed Nm1 [rpm] which is the rotation speed of the first rotary machine MG1, an MG2 rotation speed Nm2 [rpm] which is the rotation speed of the second rotary machine MG2, an accelerator opening Acc which is an accelerator operation amount by a driver, and a battery temperature THbat [° C.], a battery charging/discharging current Ibat [mA], and a battery voltage Vbat [V] of the battery 54) based on detection values from various sensors (for example, a supercharging pressure sensor 40, a throttle valve opening sensor 44, an engine rotation speed sensor 88, an output rotation speed sensor 90, an MG1 rotation speed sensor 92, an MG2 rotation speed sensor 94, an accelerator opening sensor 96, and a battery sensor 98) which are provided in the vehicle 10.

The electronic control unit 100 outputs various command signals (for example, an engine control command signal Se for controlling the engine 12, a rotary machine control command signal Smg for controlling the first rotary machine MG1 and the second rotary machine MG2, and a hydraulic pressure control command signal Sp for controlling the operating states of the clutch C1 and the brake B1) to various devices (for example, the engine control device 50, the inverter 52, and the hydraulic pressure control circuit 84) which are provided in the vehicle 10.

The electronic control unit 100 calculates a state of charge value SOC which is a value indicating the state of charge of the battery 54, for example, based on the battery charging/discharging current Ibat and the battery voltage Vbat. The electronic control unit 100 calculates chargeable electric power Win [W] and dischargeable electric power Wout [W] for defining an allowable range of battery power Pbat [W] which is the power of the battery 54, for example, based on the battery temperature THbat and the state of charge value SOC of the battery 54. The chargeable electric power Win and the dischargeable electric power Wout are set to curb deterioration of the battery 54. The chargeable electric power Win is possible input power for defining a limitation of input electric power of the battery 54 and the dischargeable electric power Wout is possible output power for defining a limitation of output electric power of the battery 54. Accordingly, in view of deterioration of the battery 54, it is not preferable that input power of the battery 54 exceed the chargeable electric power Win for a long time or output power of the battery 54 exceed the dischargeable electric power Wout for a long time. For example, the chargeable electric power Win and the dischargeable electric power Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in a normal area. For example, the chargeable electric power Win decreases as the state of charge value SOC increases in an area in which the state of charge value SOC is high. For example, the dischargeable electric power Wout decreases as the state of charge value SOC decreases in an area in which the state of charge value SOC is low.

Referring back to FIG. 4, for example, when the target engine operating point OPengtgt changes from the point A (the engine operating point OPengA) to the point C (the engine operating point OPengC) through the accelerator return operation, the engine operating point OPeng changes on a path a which passes over the maximum efficiency line Leng. At the point A (the engine operating point OPengA), the vehicle 10 is in an HV travel state and the engine 12 is in an operating state. At the point C (the engine operating point OPengC), the vehicle 10 is in the EV travel state and the operation of the engine 12 is stopped or the vehicle 10 is stopped.

In the vehicle 10 in which the exhaust gas recirculation device 110 is provided, it is preferable to stop the operation of the engine 12 in a state in which the engine 12 can be stably restarted after the operation thereof has been stopped when the operation of the engine 12 is stopped by performing the accelerator return operation. It is necessary to more appropriately stop the operation of the engine 12 with supply of exhaust gas to the intake system through the exhaust gas recirculation device 110. For this purpose, a target engine output Petgt [W] which changes slowly with respect to the required engine output Pe* for realizing the required drive power Pr* (that is, toward the required engine output Pe*) is calculated through slow change processing, and the engine 12 and the first rotary machine MG1 are controlled such that the engine output Per reaches the target engine output Petgt. The slow change processing is a process of slowly changing the target engine output Petgt and details thereof will be described later. For example, when the target engine operating point OPengtgt changes from the point A to the point C in FIG. 4, the target engine operating point OPengtgt is slowly changed through the slow change processing using a "smoothing rate τ" which will be described later.

When the accelerator return operation is performed, a response delay of the supercharging pressure Pchg is less likely to occur when the supercharging pressure Pchg in the engine 12 with the supercharger 18 is low, and thus the engine output Per is less likely to delay with respect to the target engine output Petgt which changes slowly. On the other hand, when the accelerator return operation is performed, a response delay of the supercharging pressure Pchg is likely to occur when the supercharging pressure Pchg in the engine 12 with the supercharger 18 is high, and thus the engine output Per is likely to delay with respect to the target engine output Petgt which changes slowly. Accordingly, the response delay of the supercharging pressure Pchg and the slow change processing using the smoothing rate τ are combined, the engine rotation speed Ne is less likely to decrease when the supercharging pressure Pchg is high than when the supercharging pressure Pchg is low, and the generated electric power Wg of the first rotary machine MG1 is less likely to decrease rapidly. In this way, electric power which is input to the battery 54 out of the generated electric power Wg of the first rotary machine MG1 is more likely to exceed the chargeable electric power Win when the supercharging pressure Pchg is high than when the supercharging pressure Pchg is low. A response delay of the supercharging pressure Pchg is a temporal delay until the supercharging pressure Pchg corresponding to the accelerator opening Acc after the accelerator return operation is reached through the accelerator return operation. Due to the response delay of the supercharging pressure Pchg, the engine output Per is less likely to decrease and the generated electric power Wg of the first rotary machine MG1 is less likely to decrease rapidly.

Referring back to FIG. 1, the electronic control unit 100 functionally includes a return operation determining unit 102, a smoothing rate setting unit 104, and a drive control unit 106. The control function of the electronic control unit 100 when the engine 12 is switched from an operating state to an operation-stopped state by performing the accelerator return operation in a state in which an accelerator depressing operation is being performed will be described below.

The return operation determining unit 102 determines whether accelerator return occurs. Whether accelerator return occurs is determined based on whether the engine 12 is switched from the operating state to the operation-stopped state by performing the accelerator return operation. For example, when the accelerator return operation is performed, it is determined that accelerator return occurs. Specifically, the return operation determining unit 102 determines that accelerator return occurs based on starting of a decrease in the accelerator opening Acc. For example, when the engine 12 is in the operation-stopped state after the accelerator return operation has been performed, it is determined that accelerator return occurs. Specifically, when the target engine output Petgt is changing slowly to a required engine output Pe* (specifically, zero because the operation of the engine 12 is stopped) for realizing the required drive power Pr* which will be described later, it is determined that accelerator return occurs.

When the return operation determining unit 102 determines that accelerator return occurs (that is, the accelerator return operation is performed), the drive control unit 106 calculates a required drive torque Tr* for the vehicle 10 by applying an actual accelerator opening Acc and a vehicle speed V to a relationship between the accelerator opening Acc and the vehicle speed V and the required drive torque Tr* (for example, a drive power map) which is calculated by experiment or design and stored in advance (that is, predetermined). In other words, since the required drive torque Tr* is a required drive power Pr* at the vehicle speed V at that time, the required drive power Pr* can be calculated using the drive power map. An output rotation speed No or the like may be applied to the drive power map instead of the vehicle speed V.

The drive control unit 106 calculates the target engine output Petgt which changes slowly with respect to the required engine output Pe* (=0) for realizing the required drive power Pr* through the slow change processing. The drive control unit 106 sets the target engine operating point OPengtgt which is expressed by the engine rotation speed Ne and the engine torque Te and which realizes the target engine output Petgt on the optimal engine operating point OPengf. The drive control unit 106 controls the engine 12 and the first rotary machine MG1 such that the engine operating point OPeng which is an operating point of the engine 12 reaches the target engine operating point OPengtgt. The engine rotation speed Ne and the engine torque Te representing the engine operating point OPeng are subjected to the slow change processing, but since the supercharging pressure Pchg is not better in responsiveness than the engine rotation speed Ne and the engine torque Te, the supercharging pressure Pchg is not subjected to the slow change processing.

A rate of change at which the target engine output Petgt subjected to the slow change processing changes from a current state to the required engine output Pe* (=0) can be determined based on a "smoothing rate τ" which will be described later.

The MG1 torque Tm1 is calculated, for example, in feedback control for operating the first rotary machine MG1 such that the engine rotation speed Ne reaches the target engine rotation speed Netgt. The MG2 torque Tm2 is calculated, for example, such that the direct engine-transmitted torque Td and the MG2 torque Tm2 are summed to be the drive torque Trr.

The smoothing rate setting unit 104 sets the smoothing rate τ which is used for the slow change processing. The smoothing rate τ represents a rate of change at which the target engine output Petgt changes to the required engine output Pe* for realizing the required drive power Pr* when the accelerator return operation is performed. The smoothing rate τ is defined, for example, as a predetermined rate of decrease in a rate process of decreasing the target engine output Petgt at the predetermined rate of decrease. Here, the predetermined rate of decrease in the rate process is a value which is greater than 0 and less than 1 and the target engine output Petgt decreases to a value obtained by multiplying the value by the predetermined rate of decrease for each rate. The smoothing rate τ may be defined as a period in which the target engine output Petgt changes slowly from the value at the time point at which the accelerator return operation is performed to the required engine output Pe* after the accelerator return operation is performed, for example, when the accelerator return operation is performed. As the smoothing rate τ becomes greater, the rate of change of the target engine output Petgt becomes less, and as the smoothing rate τ becomes less, the rate of change of the target engine output Petgt increases.

Figure 7:
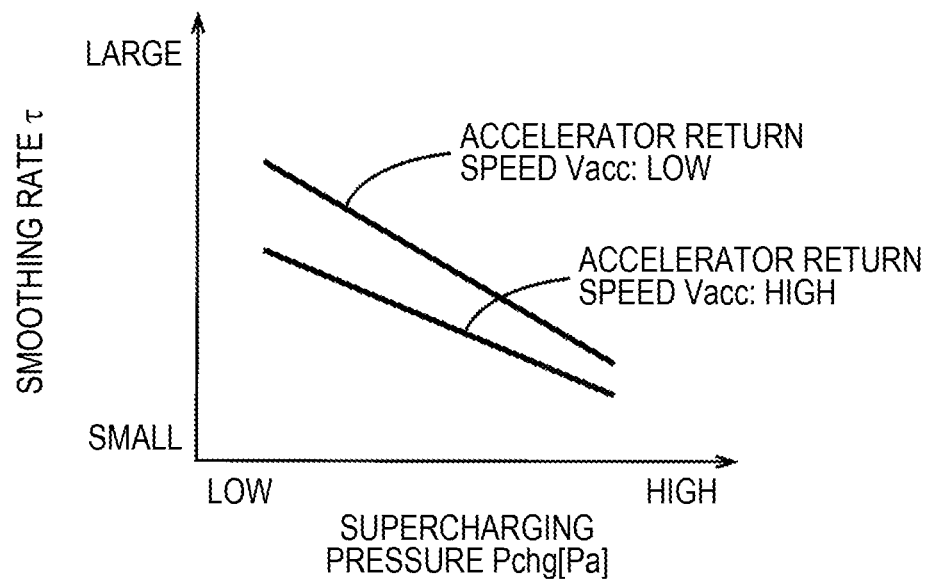
FIG. 7 is a diagram illustrating a relationship between a supercharging pressure and an accelerator return speed in an accelerator return operation and a smoothing rate.

FIG. 7 is a diagram illustrating a relationship between the supercharging pressure Pchg and an accelerator return speed Vacc [%/ms] in the accelerator return operation and the smoothing rate τ. The accelerator return speed Vacc in the accelerator return operation is a rate of change of the accelerator opening Acc when the accelerator return operation is performed. The accelerator return speed Vacc is defined, for example, as a ratio (=ΔAcc/ΔT) of a change of the accelerator opening Acc (for example, a change ΔAcc which is a difference between an opening value Accx at time t1 and an opening value Accy at time t2 in FIG. 10) in a change period of the accelerator opening Acc when the accelerator return operation is performed (for example, a change period ΔT between time t1 and time t2 in FIG. 10) to the change period.

As illustrated in FIG. 7, the smoothing rate τ is set to a smaller value when the supercharging pressure Pchg is high than when the supercharging pressure Pchg is low. This means that, when conditions other than the supercharging pressure Pchg are the same (for example, when the accelerator return speed Vacc is the same in FIG. 7), the smoothing rate τ is set to a smaller value when the supercharging pressure Pchg is high than when the supercharging pressure Pchg is low, but does not necessarily mean that, when conditions other than the supercharging pressure Pchg are different, the smoothing rate τ is set to a smaller value when the supercharging pressure Pchg is high than when the supercharging pressure Pchg is low. In the example illustrated in FIG. 7, the smoothing rate τ decreases linearly with an increase of the supercharging pressure Pchg. The smoothing rate τ is set to a smaller value when the accelerator return speed Vacc is high than when the accelerator return speed Vacc is low. This means that, when conditions other than the accelerator return speed Vacc are the same (for example, when the supercharging pressure Pchg is the same in FIG. 7), the smoothing rate τ is set to a smaller value when the accelerator return speed Vacc is high than when the accelerator return speed Vacc is low, but does not necessarily mean that, when conditions other than the accelerator return speed Vacc are different, the smoothing rate τ is set to a smaller value when the accelerator return speed Vacc is high than when the accelerator return speed Vacc is low.

Figure 8:
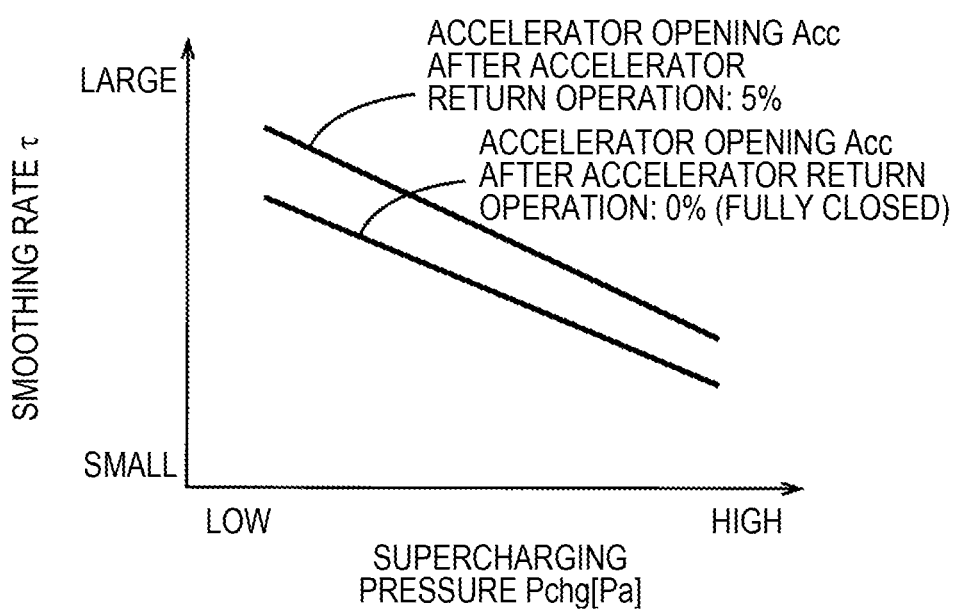
FIG. 8 is a diagram illustrating a relationship between a supercharging pressure and an accelerator opening after the accelerator return operation and a smoothing rate.

FIG. 8 is a diagram illustrating a relationship between the supercharging pressure Pchg and the accelerator opening Acc (an opening value Accy in FIG. 10) after the accelerator return operation and the smoothing rate τ. The accelerator opening Acc after the accelerator return operation is the accelerator opening Acc at a time point at which the decrease of the accelerator opening Acc is stopped when the accelerator return operation is performed (for example, an opening value Accy at time t2 in FIG. 10). Similarly to FIG. 7, the smoothing rate τ is set to a smaller value when the supercharging pressure Pchg is high than when the supercharging pressure Pchg is low. The smoothing rate τ is set to a smaller value when the accelerator opening Acc after the accelerator return operation is small than when the accelerator opening Acc after the accelerator return operation is great. This means that, when conditions other than the accelerator opening Acc after the accelerator return operation are the same (for example, when the supercharging pressure Pchg is the same in FIG. 8), the smoothing rate τ is set to a smaller value when the accelerator opening Acc after the accelerator return operation is small than when the accelerator opening Acc after the accelerator return operation is great, but does not necessarily mean that, when conditions other than the accelerator opening Acc after the accelerator return operation are different, the smoothing rate τ is set to a smaller value when the accelerator opening Acc after the accelerator return operation is small than when the accelerator opening Acc after the accelerator return operation is great.

The smoothing rate setting unit 104 sets the smoothing rate τ which is used for the slow change processing using three parameters including the supercharging pressure Pchg, the accelerator return speed Vacc in the accelerator return operation, and the accelerator opening Acc after the accelerator return operation as variables as described above with reference to FIGS. 7 and 8. That is, the smoothing rate setting unit 104 sets the smoothing rate τ based on the supercharging pressure Pchg, the accelerator return speed Vacc in the accelerator return operation, and the accelerator opening Acc after the accelerator return operation. The smoothing rate τ is set to be equal to or greater than a predetermined value which is calculated by experiment or design and stored in advance such that the operation of the engine 12 is stopped in a state in which the engine 12 can be stably restarted after the operation has been stopped in the vehicle 10 in which the exhaust gas recirculation device 110 is mounted.

In a state in which the accelerator depressing operation is performed before the accelerator return operation is performed, since the required drive torque Tr* is great, the second rotary machine MG2 consumes the generated electric power Wg of the first rotary machine MG1 and serves as a power source. On the other hand, when the accelerator return operation is performed, the required drive torque Tr* needs to be rapidly decreased and thus the second rotary machine MG2 does not serve as a power source. For example, when the vehicle 10 stops by performing the accelerator return operation, the MG2 torque Tm2 decreases to zero and electric power which is consumed in the second rotary machine MG2 decreases rapidly to zero. In this way, when the accelerator return operation is performed in a state in which the accelerator depressing operation is being performed, the electric power which is consumed in the second rotary machine MG2 decreases rapidly.

Since electric power which is consumed out of the generated electric power Wg of the first rotary machine MG1 decreases rapidly by the accelerator return operation, the decrease of the generated electric power Wg of the first rotary machine MG1 delays due to a response delay of the supercharging pressure Pchg and thus electric power which is input to the battery 54 out of the generated electric power Wg of the first rotary machine MG1 is likely to exceed the chargeable electric power Win. Particularly, since the response delay of the supercharging pressure Pchg is great when the supercharging pressure Pchg is great, the electric power which is input to the battery 54 is likely to exceed the chargeable electric power Win. Accordingly, the smoothing rate τ which is set by the smoothing rate setting unit 104 is set such that the target engine output Petgt does not change slowly more than necessary by combination of the response delay of the supercharging pressure Pchg and the slow change processing using the smoothing rate τ (does not change slowly), that is, such that the decrease of the generated electric power Wg of the first rotary machine MG1 is not delayed more than necessary.

Referring back to FIG. 1, the drive control unit 106 has a function of an engine control unit, a function of a rotary machine control unit, and a function of a power transmission switching unit and performs hybrid drive control of the engine 12, the first rotary machine MG1, and the second rotary machine MG2 and gear shifting control of a transmission which is provided in the power transmission device 14 using the functions. The function of the engine control unit is an engine control means that controls the operation of the engine 12. The function of the rotary machine control unit is a rotary machine control means that controls the operations of the first rotary machine MG1 and the second rotary machine MG2 via the inverter 52. The function of the power transmission switching unit is a power transmission switching means that controls switching of a power transmission state in the gear shifting unit 58.

In this way, the drive control unit 106 controls the MG1 torque Tm1 which is a reaction torque of the first rotary machine MG1 which is input to the sun gear S1 of the differential unit 60 such that the engine rotation speed Ne reaches the target engine rotation speed Netgt. That is, the first rotary machine MG1 can adjust the engine rotation speed Ne by controlling the MG1 torque Tm1 which is the reaction torque. By controlling the engine 12 and the differential unit 60 which is a stepless transmission, the engine rotation speed Ne reaches the target engine rotation speed Netgt.

When the vehicle 10 is in the HV travel mode, the drive control unit 106 outputs an engine control command signal Se and a rotary machine control command signal Smg. The engine 12 is controlled in accordance with the engine control command signal Se such that the engine operating point OPeng reaches the target engine operating point OPengtgt. The first rotary machine MG1 and the second rotary machine MG2 are controlled in accordance with the rotary machine control command signal Smg such that the MG1 torque Tm1 and the MG2 torque Tm2 in the HV travel mode in which the output torques are calculated are obtained. Specifically, the drive control unit 106 controls the engine control device 50 and the inverter 52 such that the engine operating point OPeng reaches the target engine operating point OPengtgt. Regarding the supercharging pressure Pchg, the valve opening of the WGV 30 is feedback-controlled such that the actual supercharging pressure Pchg which is detected by the supercharging pressure sensor 40 reaches the target supercharging pressure Pchgtgt for realizing the required engine output Pe*.

The drive control unit 106 controls engagement operations of the clutch C1 and the brake B1 based on a travel mode which is set up. The drive control unit 106 outputs a hydraulic pressure control command signal Sp for engaging and/or disengaging the clutch C1 and the brake B1 to the hydraulic pressure control circuit 84 such that power transmission for traveling in the set-up travel mode is possible.

Figure 9:
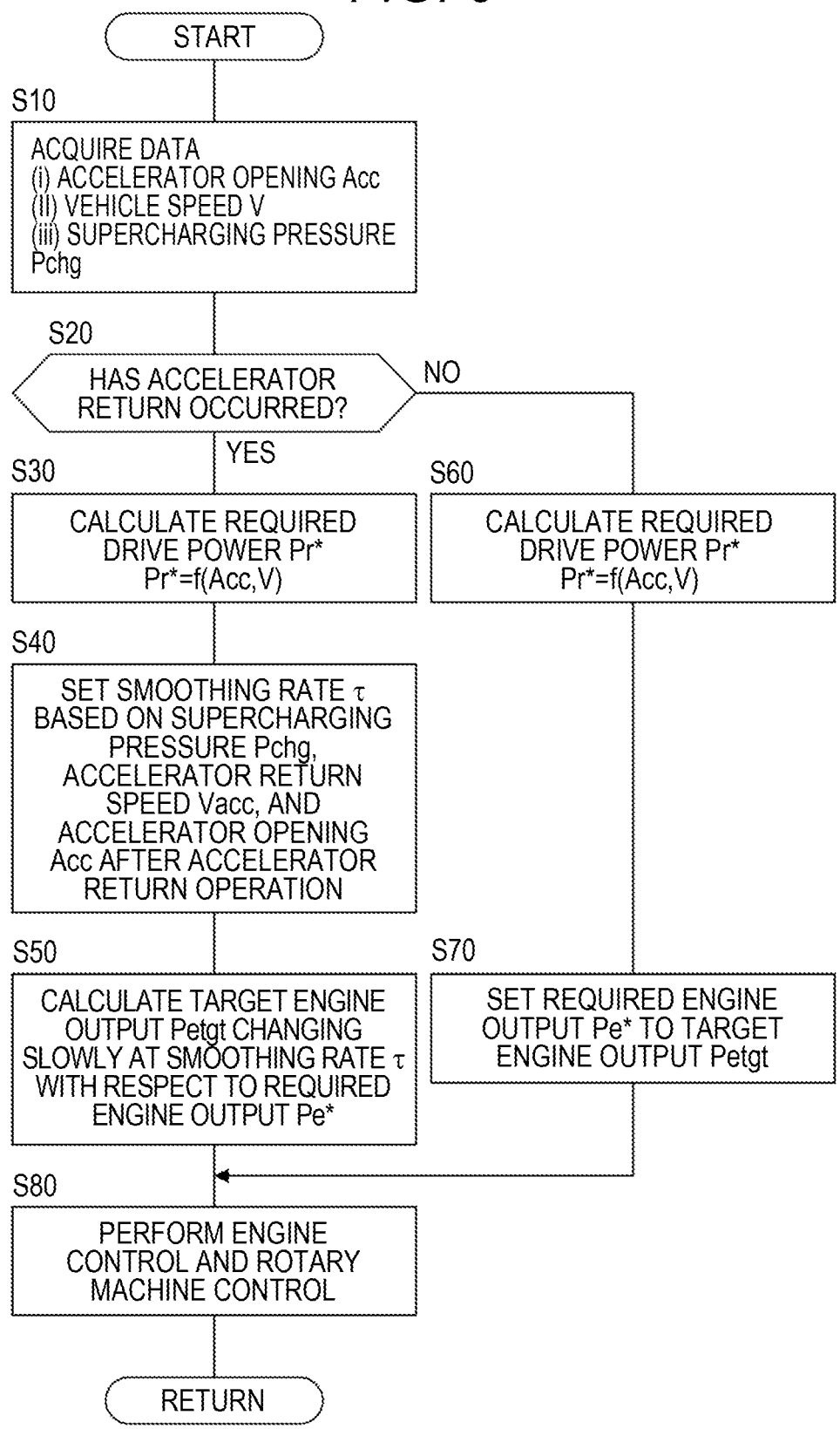
FIG. 9 is a diagram illustrating an example of a flowchart of a principal part of the control operation of the electronic control unit.

FIG. 9 is an example of a flowchart illustrating a principal part of the control operation of the electronic control unit 100. The flowchart illustrated in FIG. 9 is repeatedly performed, for example, at intervals of a predetermined time (for example, several ms) when the vehicle 10 is in the HV travel mode.

First, in Step S10 corresponding to the function of the return operation determining unit 102, data of the accelerator opening Acc, the vehicle speed V, and the supercharging pressure Pchg is acquired. Then, Step S20 is performed.

In Step S20 corresponding to the function of the return operation determining unit 102, it is determined whether accelerator return occurs. When the determination result of Step S20 is positive (when it is determined that accelerator return occurs), Step S30 is performed. When the determination result of Step S20 is negative (when it is determined that accelerator return does not occur), Step S60 is performed. When the accelerator return operation is performed and thus the determination result of Step S20 is positive, a series of steps including Steps S30, S40, S50, and S80 are started. Then, when the determination result of Step S20 is continuously positive after the accelerator return operation has been performed, the series of steps are continuously performed.

In Step S30 corresponding to the function of the drive control unit 106, required drive power Pr* is calculated. Then, Step S40 is performed.

In Step S40 corresponding to the function of the smoothing rate setting unit 104, the smoothing rate τ is set based on the supercharging pressure Pchg, the accelerator return speed Vacc, and the accelerator opening Acc after the accelerator return operation. Then, Step S50 is performed.

In Step S50 corresponding to the function of the drive control unit 106, a target engine output Petgt which changes slowly with respect to a required engine output Pe* is calculated through the slow change processing using the smoothing rate τ set in Step S40. For example, when the smoothing rate τ is defined as a predetermined rate of decrease in the rate process, a value obtained by multiplying the target engine output Petgt at the previous time of execution of the flowchart by the smoothing rate τ is calculated as the target engine output Petgt at the current time of execution of the flowchart. Then, Step S80 is performed.

In Step S60 corresponding to the function of the drive control unit 106, the required drive power Pr* is calculated. Then, Step S70 is performed.

In Step S70 corresponding to the function of the drive control unit 106, for example, the required engine output Pe* becomes the target engine output Petgt. Then, Step S80 is performed.

In Step S80 corresponding to the function of the drive control unit 106, the engine 12 and the first rotary machine MG1 are controlled such that the engine operating point OPeng reaches the target engine operating point OPengtgt which is expressed by the engine rotation speed Ne and the engine torque Te for realizing the target engine output Petgt. Then, the flowchart is restarted.

Figure 10:
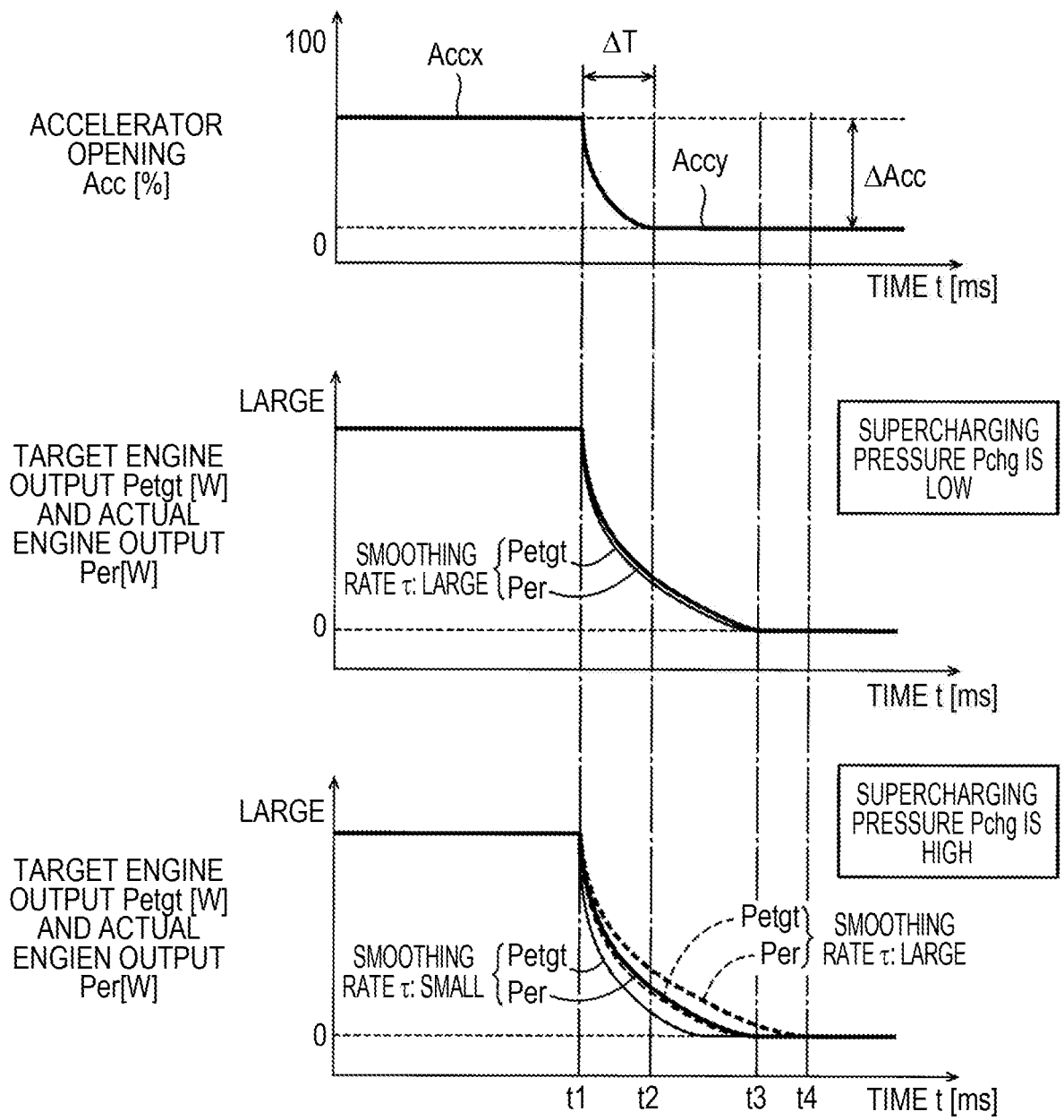
FIG. 10 is a diagram illustrating an example of a timing chart when the control operation of the electronic control unit illustrated in FIG. 9 is performed.

FIG. 10 illustrates an example of a timing chart when the control operation of the electronic control unit 100 illustrated in FIG. 9 is performed. The horizontal axis in FIG. 10 represents time t [ms].

The upper part of FIG. 10 is a diagram illustrating the accelerator opening Acc over time. At time t1, the accelerator opening Acc starts decreasing. Time t1 is a time point at which the accelerator return operation is performed. Before time t1, the accelerator opening Acc has an opening value Accx, and the vehicle 10 is traveling in the HV travel mode. At time t1, it is determined that the vehicle 10 is switched to the EV travel mode with the decrease of the accelerator opening Acc. At time t2, the accelerator opening Acc becomes an opening value Accy (=0). The opening value Accy (=0) is an accelerator opening Acc after the accelerator return operation has been performed. After time t2, the accelerator opening Acc is maintained at the opening value Accy (=0).

The medium part of FIG. 10 is a diagram illustrating the target engine output Petgt and the actual engine output Per over time when the supercharging pressure Pchg is low. From time t1 to time t3, the target engine output Petgt is indicated by a thin solid line and the actual engine output Per is indicated by a thick solid line. From time t1 to time t2, the required drive power Pr* decreases with the decrease of the accelerator opening Acc, and the target engine output Petgt decreases based on the smoothing rate τ which is set when the supercharging pressure Pchg is low (a value greater than that when the supercharging pressure Pchg is high). At time t2, the target engine output Petgt does not yet reach the required engine output Pe* (=0) corresponding to the opening value Accy (=0) of the accelerator opening Acc after the accelerator return operation has been performed. Accordingly, after time t2, the target engine output Petgt continues to decrease until the target engine output Petgt reaches the required engine output Pe* (=0). At a time point slightly before time t3, the target engine output Petgt reaches the required engine output Pe* (=0). Since the response delay of the supercharging pressure Pchg is much less when the supercharging pressure Pchg is low than when the supercharging pressure Pchg is high, the actual engine output Per decreases to follow the target engine output Petgt without almost a delay and reaches the required engine output Pe* (=0) at time t3. In a period from time t1 to time t3 in which the actual engine output Per changes, the operation of the engine 12 is stopped in a state in which the engine 12 can be stably restarted after the operation has been stopped.

The lower part of FIG. 10 is a diagram illustrating the target engine output Petgt and the actual engine output Per when the supercharging pressure Pchg is high. From time t1 to time t3, the target engine output Petgt based on the smoothing rate τ which is set when the supercharging pressure Pchg is high (a value which is less than when the supercharging pressure Pchg is low) is indicated by a thin solid line, and the actual engine output Per associated with the target engine output Petgt is indicated by a thick solid line. From time t1 to time t3, since the smoothing rate τ is set to a smaller value than that when the supercharging pressure Pchg is low, the target engine output Petgt reaches the required engine output Pe* (=0) more rapidly than that when the supercharging pressure Pchg is low as illustrated in the middle part of FIG. 10. Specifically, at a time point slightly before a medium time point between time t2 and time t3, the target engine output Petgt reaches the required engine output Pe* (=0). Since the response delay of the supercharging pressure Pchg is greater when the supercharging pressure Pchg is high than when the supercharging pressure Pchg is low, the actual engine output Per decreases with a delay corresponding to the response delay of the supercharging pressure Pchg with respect to the target engine output Petgt and reaches the required engine output Pe* (=0) at time t3. In the period from time t1 to time t3 in which the actual engine output Per changes, the operation of the engine 12 is stopped in a state in which the engine 12 can be stably restarted after the operation has been stopped. In this way, the response delay of the supercharging pressure Pchg and the slow change processing using the smoothing rate τ are combined such that the target engine output Petgt changes slowly more than necessary, and the decrease of the actual engine output Per is not delayed more than necessary. Accordingly, the decrease of the generated electric power Wg of the first rotary machine MG1 is not delayed more than necessary.

In the lower part of FIG. 10, for the purpose of comparison, the target engine output Petgt when the smoothing rate τ which is set when the supercharging pressure Pchg is high has a large value similarly to the case in which the supercharging pressure Pchg is low is indicated by a thin dotted line and the actual engine output Per with respect to the target engine output Petgt is indicated by a thick dotted line. Since the smoothing rate τ is set to a large value similarly to the case in which the supercharging pressure Pchg is low from time t1 to time t3, the target engine output Petgt reaches the required engine output Pe* (=0) at a time point slightly before time t3. When the supercharging pressure Pchg is high, the response delay of the supercharging pressure Pchg is great as described above. Accordingly, the actual engine output Per decreases with a delay corresponding to the response delay of the supercharging pressure Pchg with respect to the target engine output Petgt and reaches the required engine output Pe* (=0) at time t4 (>t3).

In this way, when the smoothing rate τ is set to a large value in the case in which the supercharging pressure Pchg is high similarly to the case in which the supercharging pressure Pchg is low, the period in which the actual engine output Per decreases (from time t1 to time t4) is longer than that when the smoothing rate τ is set to a small value. Accordingly, there is a margin in the time period in which the operation of the engine 12 is stopped in a state in which the engine 12 can be stably restarted after the operation has been stopped. On the other hand, the period in which the actual engine output Per decreases becomes longer than necessary as described above and the engine rotation speed Ne decreases slowly and thus the generated electric power Wg of the first rotary machine MG1 is less likely to decrease. Accordingly, the electric power which is input to the battery 54 out of the generated electric power Wg of the first rotary machine MG1 is likely to exceed the chargeable electric power Win.

When the smoothing rate τ is set to a smaller value when the supercharging pressure Pchg is high than when the supercharging pressure Pchg is low, the period in which the actual engine output Per decreases is prevented from becoming excessively long in comparison with a case in which the smoothing rate is set to a large value similarly to the case in which the supercharging pressure Pchg is low. Accordingly, the operation of the engine 12 is stopped in a state in which the engine 12 can be stably restarted after the operation has been stopped and the engine rotation speed Ne decreases rapidly, and thus the generated electric power Wg of the first rotary machine MG1 decreases rapidly. As a result, the electric power which is input to the battery 54 out of the generated electric power Wg of the first rotary machine MG1 is prevented from exceeding the chargeable electric power Win.

According to this embodiment, the control device for a hybrid vehicle includes: (A) the drive control unit 106 configured (a1) to calculate required drive power Pr* which is required for the vehicle 10 based on an accelerator opening Acc when an accelerator return operation is performed, (a2) to calculate a target engine output Petgt which changes slowly with respect to a required engine output Pe* for realizing the required drive power Pr* through slow change processing, and (a3) to control the engine 12 and the first rotary machine MG1 such that an engine output Per reaches the target engine output Petgt; and (B) the smoothing rate setting unit 104 configured to change a smoothing rate which is used for the slow change processing based on a supercharging pressure Pchg in the engine 12 and to set the smoothing rate τ to a smaller value when the supercharging pressure Pchg is high than when the supercharging pressure Pchg is low. In this way, when the accelerator return operation is performed, the smoothing rate τ is set to a smaller value when the supercharging pressure Pchg is high than when the supercharging pressure Pchg is low. Accordingly, even in a case in which the supercharging pressure Pchg is high such that a response delay of the supercharging pressure Pchg is likely to occur, the operation of the engine 12 is stopped, for example, in a state in which the engine 12 is stably restarted after the operation of the engine 12 has been stopped, the engine output Per decreases rapidly in comparison with a case in which the smoothing rate τ is set to a great value similarly to the case in which the supercharging pressure Pchg is low, and the generated electric power Wg of the first rotary machine MG1 decreases rapidly. As a result, electric power which is input to the battery 54 out of the generated electric power Wg of the first rotary machine MG1 is prevented from exceeding chargeable electric power Win.

According to this embodiment, the vehicle 10 further includes a second rotary machine MG2 that transmits and receives electric power to and from the battery 54 and is connected to a power transmission path Pt between the engine 12 and driving wheels 16 in a power-transmittable manner, and the second rotary machine MG2 consumes the generated electric power Wg of the first rotary machine MG1 when an accelerator depressing operation is performed and does not consume the generated electric power Wg of the first rotary machine MG1 when the accelerator return operation is performed. When the accelerator return operation is performed in a state in which the accelerator depressing operation is being performed, a state in which the generated electric power Wg of the first rotary machine MG1 is consumed in the second rotary machine MG2 is changed to a state in which the generated electric power Wg is not consumed and thus electric power which is input to the battery 54 out of the generated electric power Wg of the first rotary machine MG1 is likely to exceed chargeable electric power Win. Since the smoothing rate τ is set to a smaller value when the supercharging pressure Pchg is high than when the supercharging pressure Pchg is low, the engine output Per decreases rapidly in comparison with a case in which the smoothing rate τ is set to a great value similarly to the case in which the supercharging pressure Pchg is low and the generated electric power Wg of the first rotary machine MG1 decreases rapidly even when the supercharging pressure Pchg is high such that a response delay of the supercharging pressure Pchg is likely to occur. As a result, electric power which is input to the battery 54 out of the generated electric power Wg of the first rotary machine MG1 is prevented from exceeding chargeable electric power Win.

According to this embodiment, the smoothing rate setting unit 104 further sets the smoothing rate τ to a smaller value when an accelerator return speed Vacc in the accelerator return operation is high than when the accelerator return speed Vacc is low based on the accelerator return speed Vacc in the accelerator return operation. In this way, since the smoothing rate τ is set to a smaller value when the accelerator return speed Vacc in the accelerator return operation is high than when the accelerator return speed Vacc is low, the engine output Per decreases at a rate corresponding to a driver's intention of deceleration.

According to this embodiment, the smoothing rate setting unit 104 further sets the smoothing rate τ to a smaller value when the accelerator opening Acc (an opening value Accy) after the accelerator return operation is small than when the opening value Accy is large based on the accelerator opening Accy after the accelerator return operation. In this way, since the smoothing rate τ is set to a smaller value when the opening value Accy is small than when the opening value Accy is large, the engine output Per decreases at a rate corresponding to a driver's intention of deceleration.

Figures 11, 12:
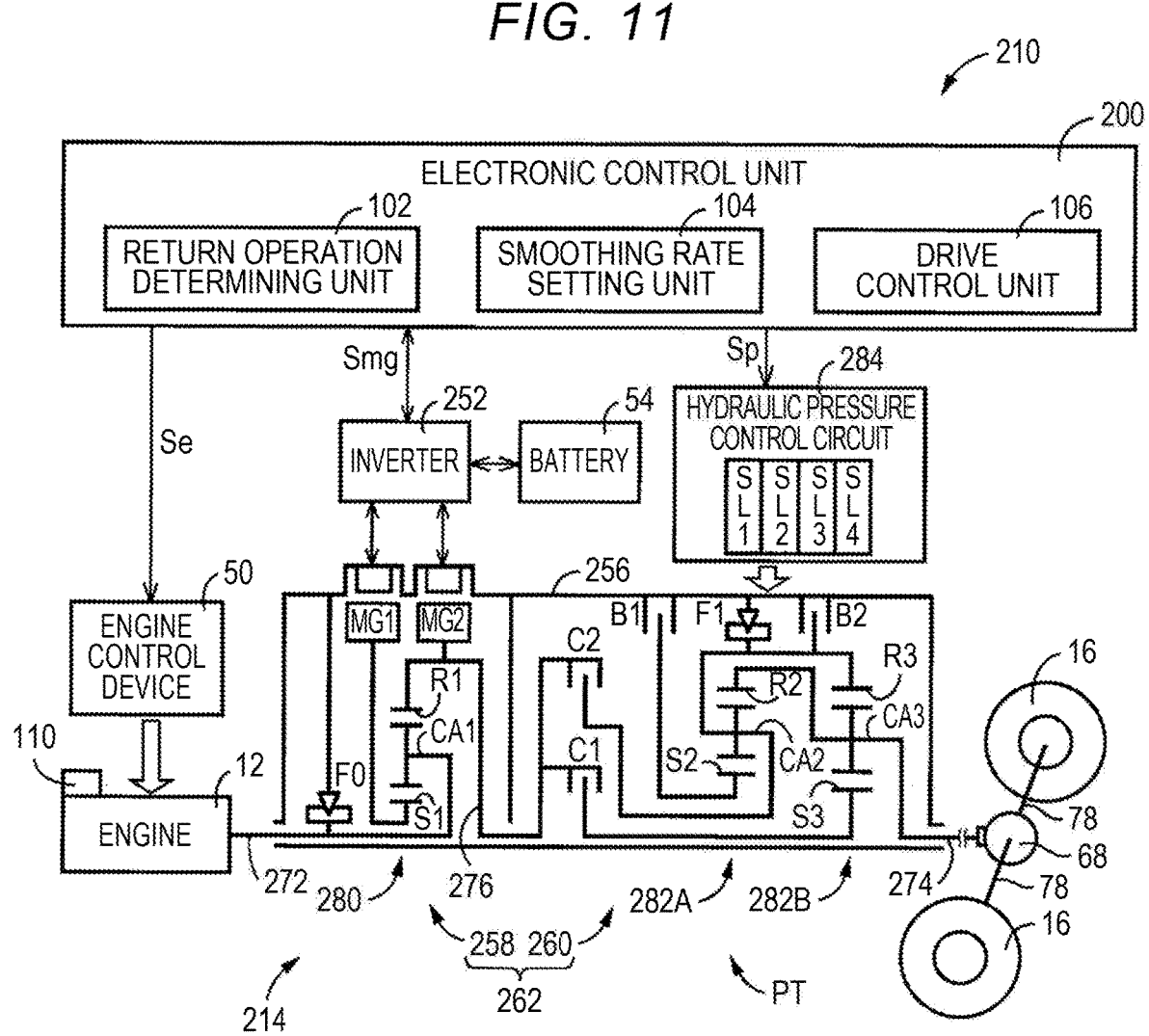
FIG. 11 is a functional block diagram schematically illustrating a configuration of a vehicle in which an electronic control unit according to a second embodiment of the disclosure is mounted and illustrating a principal part of a control function for various types of control in the vehicle.
FIG. 12 is an engagement operation table illustrating a relationship between gear shifting operations of a stepped gear shifting unit illustrated in FIG. 11 and combinations of operating states of engagement devices which are used therein.

FIG. 11 is a functional block diagram schematically illustrating a configuration of a hybrid vehicle 210 in which an electronic control unit 200 according to a second embodiment of the disclosure is mounted and illustrating a principal part of a control function for various types of control in the hybrid vehicle 210. The hybrid vehicle 210 (hereinafter referred to as a "vehicle 210") includes an engine 12, a first rotary machine MG1, a second rotary machine MG2, a power transmission device 214, and driving wheels 16. Elements of the second embodiment which are substantially common to the functions of the first embodiment will be referred to by the same reference signs and description thereof will not be repeated.

An engine torque Te of the engine 12 is controlled by causing an electronic control unit 200 which will be described later to control an engine control device 50 which is provided in the vehicle 210.

The first rotary machine MG1 and the second rotary machine MG2 are connected to a battery 54 which is provided in the vehicle 210 via an inverter 252 which is provided in the vehicle 210. In the first rotary machine MG1 and the second rotary machine MG2, an MG1 torque Tm1 and an MG2 torque Tm2 are controlled by causing the electronic control unit 200 which will be described later to control the inverter 252.

The power transmission device 214 includes an electrical stepless gear shifting unit 258 and a mechanical stepped gear shifting unit 260 which are arranged in series on a common axis in a case 256 that is a non-rotary member attached to the vehicle body. The stepless gear shifting unit 258 is connected to the engine 12 directly or indirectly via a damper which is not illustrated or the like. The stepped gear shifting unit 260 is connected to an output side of the stepless gear shifting unit 258. The power transmission device 214 includes a differential gear 68 that is connected to an output shaft 274 which is an output rotary member of the stepped gear shifting unit 260 and a pair of axles 78 that is connected to the differential gear 68. In the power transmission device 214, power which is output from the engine 12 or the second rotary machine MG2 is transmitted to the stepped gear shifting unit 260. The power transmitted to the stepped gear shifting unit 260 is transmitted to the driving wheels 16 via the differential gear 68 or the like. The power transmission device 214 having this configuration is suitably used for a vehicle of a front-engine rear-drive (FR) type. The stepless gear shifting unit 258, the stepped gear shifting unit 260, or the like is disposed to be substantially symmetric with respect to the common axis, and a lower half with respect to the axis is not illustrated in FIG. 11. The common axis is an axis of a crankshaft of the engine 12, an input shaft 272 connected to the crankshaft, or the like. The stepless gear shifting unit 258, the intermediate transmission member 276, the stepped gear shifting unit 260, the differential gear 68, and the axles 78 in the power transmission device 214 constitute the power transmission path PT which is provided between the engine 12 and the driving wheels 16.

The stepless gear shifting unit 258 includes a differential mechanism 280 which is a power split mechanism that mechanically splits power of the engine 12 to the first rotary machine MG1 and an intermediate transmission member 276 which is an output rotary member of the stepless gear shifting unit 258. The first rotary machine MG1 is a rotary machine to which power of the engine 12 is transmitted. The second rotary machine MG2 is connected to the intermediate transmission member 276 in a power-transmittable manner. Since the intermediate transmission member 276 is connected to the driving wheels 16 via the stepped gear shifting unit 260, the second rotary machine MG2 is connected to the power transmission path PT in a power-transmittable manner, and the second rotary machine MG2 is a rotary machine that is connected to the driving wheels 16 in a power-transmittable manner. The differential mechanism 280 is a differential mechanism that splits and transmits power of the engine 12 to the driving wheels 16 and the first rotary machine MG1. The stepless gear shifting unit 258 is an electrical stepless transmission in which a differential state of the differential mechanism 280 (that is, a differential state of the stepless gear shifting unit 258) is controlled by controlling the operating state of the first rotary machine MG1 which is connected to the differential mechanism 280 in a power-transmittable manner. The first rotary machine MG1 is a rotary machine that can control an engine rotation speed Ne.

The differential mechanism 280 is a known single-pinion type planetary gear unit including a sun gear S1, a carrier CA1, and a ring gear R1.

The stepped gear shifting unit 260 is a mechanical gear shifting mechanism which is a stepped transmission constituting a part of the power transmission path PT between the intermediate transmission member 276 and the driving wheels 16, that is, an automatic transmission constituting a part of the power transmission path PT between the differential mechanism 280 and the driving wheels 16. The intermediate transmission member 276 also serves as an input rotary member of the stepped gear shifting unit 260. The stepped gear shifting unit 260 is, for example, a known planetary gear type automatic transmission including a plurality of planetary gear mechanisms including a first planetary gear mechanism 282A and a second planetary gear mechanism 282B and a plurality of engagement devices including a clutch C1, a clutch C2, a brake B1, a brake B2, and a one-way clutch F1. In the following description, the clutch C1, the clutch C2, the brake B1, and the brake B2 are simply referred to as engagement devices CB when they are not particularly distinguished from each other. The first planetary gear mechanism 282A is a known single-pinion type planetary gear mechanism including a sun gear S2, a carrier CA2, and a ring gear R2. The second planetary gear mechanism 282B is a known single-pinion type planetary gear mechanism including a sun gear S3, a carrier CA3, and a ring gear R3.

The differential mechanism 280, the first planetary gear mechanism 282A, the second planetary gear mechanism 282B, the engagement devices CB, the one-way clutch F1, the first rotary machine MG1, and the second rotary machine MG2 are connected as illustrated in FIG. 11. In the differential mechanism 280, the carrier CA1 serves as an input element, the sun gear S1 serves as a reaction element, and the ring gear R1 serves as an output element.

Each engagement device CB is a hydraulic frictional engagement device. An engagement torque which is a torque capacity of each engagement device CB is changed using regulated engagement oil pressures which are output from solenoid valves SL1 to SL4 in a hydraulic pressure control circuit 284 provided in the vehicle 210. Accordingly, the operating state such as an engaged state or a disengaged state of each engagement device CB is switched.

In the stepped gear shifting unit 260, one gear stage of a plurality of gear stages with different gear ratios γat (=AT input rotation speed Nati [rpm]/AT output rotation speed Nato [rpm]) is formed by switching a combination of operating states of a plurality of engagement devices CB. In this embodiment, a gear stage which is formed in the stepped gear shifting unit 260 is referred to as an AT gear stage. The AT input rotation speed Nati is an input rotation speed of the stepped gear shifting unit 260 and has the same value as a rotation speed of the intermediate transmission member 276 and the same value as an MG2 rotation speed Nm2. The AT output rotation speed Nato is a rotation speed of the output shaft 274 which is an output rotary member of the stepped gear shifting unit 260 and is also an output rotation speed of a composite transmission 262 which is a combined transmission including the stepless gear shifting unit 258 and the stepped gear shifting unit 260.

FIG. 12 is an engagement operation table illustrating a relationship between a gear shifting operation of the stepped gear shifting unit 260 illustrated in FIG. 11 and a combination of operating states of the engagement devices CB which are used therein. In the stepped gear shifting unit 260, for example, four AT gear stages for forward movement including a first AT gear stage ("1st" in FIG. 12) to a fourth AT gear stage ("4th" in FIG. 12) are formed as a plurality of AT gear stages. The gear ratio γat of the first AT gear stage is the highest and the gear ratio γat becomes lower in higher AT gear stages. An AT gear stage for reverse movement ("Rev" in FIG. 12) is formed, for example, by engagement of the clutch C1 and engagement of the brake B2. That is, for example, the first AT gear stage is formed at the time of reverse travel as will be described later. In FIG. 12, "O" denotes an engaged state, "Δ" denotes an engaged state at the time of engine braking or at the time of coast downshift of the stepped gear shifting unit 260, and a blank denotes a disengaged state. A coast downshift is, for example, a downshift which is performed in a decelerating travel state with an accelerator turned off out of downshifts which are performed due to a decrease in the vehicle speed V during decelerating travel with the accelerator turned off (the accelerator opening Acc is 0 or substantially 0).

In the stepped gear shifting unit 260, for example, an AT gear stage which is formed according to the accelerator opening Acc which is an amount of operation of an accelerator by a driver, the vehicle speed V, or the like is switched, that is, a plurality of AT gear stages is selectively formed, by the electronic control unit 200 which will be described later. For example, in gear shifting control of the stepped gear shifting unit 260, so-called clutch-to-clutch gear shifting in which gear shifting is performed by switching one of the engagement devices CB, that is, gear shifting is performed by switching of the engagement devices CB between engagement and disengagement, is performed.

The vehicle 210 additionally includes a one-way clutch F0 (see FIG. 11). The one-way clutch F0 is a lock mechanism that can fix the carrier CA1 to be non-rotatable. That is, the one-way clutch F0 is a lock mechanism that can fix the input shaft 272 which is connected to the crankshaft of the engine 12 and which rotates integrally with the carrier CA1 to the case 256. In the one-way clutch F0, one member of two members that are rotatable relative to each other is integrally connected to the input shaft 272 and the other member is integrally connected to the case 256. The one-way clutch F0 idles in a positive rotating direction which is a rotating direction at the time of operation of the engine 12 and is automatically engaged in a negative rotating direction which is opposite to that at the time of operation of the engine 12. Accordingly, when the one-way clutch F0 idles, the engine 12 is rotatable relative to the case 256. On the other hand, when the one-way clutch F0 is engaged, the engine 12 is not rotatable relative to the case 256. That is, the engine 12 is fixed to the case 256 by engagement of the one-way clutch F0. In this way, the one-way clutch F0 permits rotation in the positive rotating direction of the carrier CA1 which is a rotating direction at the time of operation of the engine 12 and prohibits rotation in the negative rotating direction of the carrier CA1. That is, the one-way clutch F0 is a lock mechanism that can permit rotation in the positive rotating direction of the engine 12 and prohibit rotation in the negative rotating direction of the engine 12.

The vehicle 210 further includes an electronic control unit 200 which is a controller including a control device for the vehicle 210 associated with control of the engine 12, the first rotary machine MG1, the second rotary machine MG2, and the like. The electronic control unit 200 has the same configuration as the electronic control unit 100 described above in the first embodiment. The electronic control unit 200 is supplied with various signals which are the same as those supplied to the electronic control unit 100. Various command signals which are the same as those output from the electronic control unit 100 are output from the electronic control unit 200. The electronic control unit 200 has functions equivalent to the functions of the return operation determining unit 102, the smoothing rate setting unit 104, and the drive control unit 106 similarly to the electronic control unit 100. Accordingly, similarly to the first embodiment, the smoothing rate τ is set to a smaller value when the supercharging pressure Pchg is high than when the supercharging pressure Pchg is low. Accordingly, even in a case in which the supercharging pressure Pchg is high such that a response delay of the supercharging pressure Pchg is likely to occur, the operation of the engine 12 is stopped, for example, in a state in which the engine 12 is stably restarted after the operation of the engine 12 has been stopped, the engine output Per decreases rapidly in comparison with a case in which the smoothing rate τ is set to a great value similarly to the case in which the supercharging pressure Pchg is low, and the generated electric power Wg of the first rotary machine MG1 decreases rapidly. As a result, electric power which is input to the battery 54 out of the generated electric power Wg of the first rotary machine MG1 is prevented from exceeding chargeable electric power Win. The engine 12 and the differential mechanism 280 which is a stepless transmission are controlled such that the engine rotation speed Ne reaches the target engine rotation speed Netgt. The electronic control unit 200 corresponds to a "control device" in the disclosure.

According to this embodiment, the same advantages as in the first embodiment are obtained.

While embodiments of the disclosure have been described above in detail with reference to the accompanying drawings, the disclosure can be applied to other aspects.

In the flowchart of FIG. 9 described above in the first embodiment, the smoothing rate τ is set using three parameters including the supercharging pressure Pchg, the accelerator return speed Vacc, and the accelerator opening Acc (an opening value Accy) after the accelerator return operation as variables, but the disclosure is not limited thereto. For example, the smoothing rate τ can be set using at least the supercharging pressure Pchg out of the three variables as a variable. When the supercharging pressure Pchg is included as a variable, the engine output Per decreases rapidly and the generated electric power Wg of the first rotary machine MG1 decreases rapidly by setting the smoothing rate τ to a smaller value when the supercharging pressure Pchg is high than when the supercharging pressure Pchg is low, in comparison with a case in which the smoothing rate τ is set to a large value similarly to the case in which the supercharging pressure Pchg is low. Accordingly, the electric power which is input to the battery 54 out of the generated electric power Wg of the first rotary machine MG1 is prevented from exceeding the chargeable electric power Win.

In the slow change processing based on the smoothing rate τ in the first and second embodiments, the target engine operating point OPengtgt changes on the path a passing through the maximum efficiency line Leng, but may change to be temporarily separated from the maximum efficiency line Leng.

In the slow change processing according to the first and second embodiments, the target engine output Petgt which changes slowly with respect to the required engine output Pe* is directly calculated, but the disclosure is not limited thereto. For example, the target engine output Petgt which changes slowly with respect to the required engine output Pe* may be calculated by repeating calculating target drive power Prtgt [N] which changes slowly with respect to the required drive power Pr* and then calculating the target engine output Petgt for realizing the target drive power Prtgt.

In the first and second embodiments, the predetermined rate of decrease in the rate process and the period in which the target engine output Petgt changes slowly to the required engine output Pe* are exemplified as the definition of the smoothing rate τ, but the disclosure is not limited thereto. For example, the smoothing rate τ may be defined as a time constant of a linear delay function.

In the first and second embodiments, the smoothing rate τ which is used for the slow change processing is set such that the operation of the engine 12 is stopped in a state in which the engine 12 can be stably restarted after the operation has been stopped when the accelerator return operation is performed in a vehicle 10 or 210 in which the exhaust gas recirculation device 110 is provided, but the disclosure is not limited thereto. For example, the disclosure may be applied to a configuration in which the exhaust gas recirculation device 110 is not provided in the vehicle 10 or 210 and the target engine output Petgt changes slowly when the operation of the engine 12 is stopped.

In the first and second embodiments, the operation of the engine 12 is stopped from a state in which it is operating when the accelerator return operation has been performed, but the disclosure is not limited thereto. For example, the disclosure may be applied to a configuration in which the required drive power Pr* is decreased by the accelerator return operation in the HV travel state and the target engine output Petgt changes slowly with respect to the decreased required engine output Pe* (≠0) without stopping the operation of the engine 12 for the purpose of realizing the required drive power Pr*. In this case, regarding determination of whether accelerator return occurs in the return operation determining unit 102, it is determined that accelerator return occurs, for example, when the accelerator return operation is performed and when the engine output Per is changing to the required engine output Pe* (≠0) after the accelerator return operation has been performed. Accordingly, even when the supercharging pressure Pchg is high such that the response delay of the supercharging pressure Pchg is likely to occur, the response delay of the supercharging pressure Pchg and the slow change processing using the smoothing rate τ are not combined to slowly change the target engine output Petgt more than necessary, that is, the decrease of the generated electric power Wg of the first rotary machine MG1 is not delayed more than necessary.

In the first and second embodiments, the vehicle 10 or 210 includes the second rotary machine MG2 that consumes the generated electric power Wg of the first rotary machine MG1 when the accelerator depressing operation is performed and does not consume the generated electric power Wg of the first rotary machine MG1 when the accelerator return operation is performed, but the disclosure is not limited thereto. For example, the disclosure may be applied to the vehicle 10 or 210 that does not include the second rotary machine MG2.

In the first embodiment, the vehicle 10 may be a vehicle which does not include the gear shifting unit 58 and in which the engine 12 is connected to the differential unit 60. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear mechanism in which the first rotary machine MG1 and the drive gear 74 are connected to a pinion which is rotationally driven by the engine 12 and a pair of bevel gears engaging with the pinion, respectively. The second planetary gear mechanism 82 may be a mechanism with a configuration in which some rotary elements of two or more planetary gear units are connected to each other and the engine 12, the first rotary machine MG1, and the driving wheels 16 are connected to the rotary elements of such planetary gear units in a power-transmittable manner.

In the second embodiment, the one-way clutch F0 is exemplified as a lock mechanism that can fix the carrier CA1 in a non-rotatable manner, but the disclosure is not limited to the aspect. This lock mechanism may be an engagement device such as an engaging clutch, a hydraulic frictional engagement device such as a clutch or a brake, a dry engagement device, an electromagnetic frictional engagement device, or a magnetic powder type clutch which selectively connects the input shaft 272 and the case 256. Alternatively, the vehicle 210 does not have to include the one-way clutch F0.

In the first and second embodiments described above, the supercharger 18 is a known exhaust turbine type supercharger, but the disclosure is not limited to this aspect. For example, the supercharger 18 may be a mechanical pump type supercharger that is rotationally driven by the engine or the electric motor. An exhaust turbine type supercharger and a mechanical pump type supercharger may be provided together as a supercharger.

The above embodiments are merely examples of the disclosure, and the disclosure can be embodied in various aspects which have been subjected to various modifications and improvements based on knowledge of those skilled in the art without departing from the gist of the disclosure.

What is claimed is:

1. A control device for a hybrid vehicle including an engine with a supercharger, a first rotary machine that is able to adjust a rotation speed of the engine, and a power storage device that transmits and receives electric power to and from the first rotary machine, the control device comprising:
   a drive control unit configured to calculate required drive power which is required for the hybrid vehicle based on an accelerator operation amount when an accelerator return operation is performed, to calculate a target engine output which changes slowly with respect to required engine output for realizing the required drive power through slow change processing, and to control the engine and the first rotary machine such that an engine output reaches the target engine output; and
   a smoothing rate setting unit configured to change a smoothing rate which is used for the slow change processing based on a supercharging pressure in the engine and to set the smoothing rate to a smaller value when the supercharging pressure is high than when the supercharging pressure is low.

2. The control device for a hybrid vehicle according to claim 1, wherein the hybrid vehicle further includes a second rotary machine that transmits and receives electric power to and from the power storage device and is connected to a power transmission path between the engine and driving wheels in a power-transmittable manner, and
   wherein the second rotary machine consumes generated electric power of the first rotary machine when an accelerator depressing operation is performed and does not consume the generated electric power of the first rotary machine when the accelerator return operation is performed.

3. The control device for a hybrid vehicle according to claim 1, wherein the smoothing rate setting unit is configured to further set the smoothing rate to a smaller value when an accelerator return speed in the accelerator return operation is high than when the accelerator return speed is low based on the accelerator return speed in the accelerator return operation.

4. The control device for a hybrid vehicle according to claim 1, wherein the smoothing rate setting unit is configured to further set the smoothing rate to a smaller value when an accelerator operation amount after the accelerator return operation is small than when the accelerator operation amount is large based on the accelerator operation amount after the accelerator return operation.

* * * * *